United States Patent [19]

Sawada et al.

[11] Patent Number: 5,659,762
[45] Date of Patent: Aug. 19, 1997

[54] METHOD AND DEVICE FOR RAPIDLY RESTARTING A COMPUTER SYSTEM EXPANSION DEVICE FROM A POWER SAVE MODE

[75] Inventors: Yutaka Sawada, Kawasaki; Shuichi Iwata, Yokohama; Mitsuhiko Aoyagi, Ebina, all of Japan

[73] Assignee: International Business Machines Corporation, Armonk, N.Y.

[21] Appl. No.: 423,115

[22] Filed: Apr. 17, 1995

[30] Foreign Application Priority Data

Apr. 26, 1994 [JP] Japan ................................ 6-088674

[51] Int. Cl.⁶ ............................................... G06F 1/32
[52] U.S. Cl. ............................................ 395/750.05
[58] Field of Search ........................ 395/750; 369/54, 369/53, 47; 361/686

[56] References Cited

U.S. PATENT DOCUMENTS

| | | | |
|---|---|---|---|
| 5,122,999 | 6/1992 | Kimura et al. | 369/32 |
| 5,167,024 | 11/1992 | Smith et al. | 395/375 |
| 5,193,176 | 3/1993 | Brandin | 395/575 |
| 5,261,072 | 11/1993 | Siegel | 395/842 |
| 5,313,596 | 5/1994 | Swindler et al. | 395/281 |
| 5,323,291 | 6/1994 | Boyle et al. | 361/683 |
| 5,392,438 | 2/1995 | Gunji | 395/750 |
| 5,432,938 | 7/1995 | Ohashi | 395/700 |
| 5,452,277 | 9/1995 | Bajorek et al. | 369/54 |

*Primary Examiner*—Jack B. Harvey
*Assistant Examiner*—David A. Wiley
*Attorney, Agent, or Firm*—Martin J. McKinley; Andrew J. Dillon

[57] ABSTRACT

A method and device for rapidly restarting a computer system expansion device from a power save mode. The expansion device comprises a central processor for controlling the operation of the expansion device; a first memory, which is volatile, used as a working area by the central processor in handling tasks; interface for communicating with the computer system; power supply to each element in the expansion device; and a second memory, which is non-volatile and write-enable, for saving the context information held by the interface and the data stored in a first memory, in response to a request from the computer system via the interface.

18 Claims, 18 Drawing Sheets

METHOD AND DEVICE FOR RAPIDLY RESTARTING A COMPUTER SYSTEM EXPANSION DEVICE FROM A POWER SAVE MODE

BACKGROUND OF THE INVENTION

1. Technical Field

The present invention relates in general to an expansion device detachably installed into a portable computer system, such as "notebook" type computer, and more particularly to an expansion device which is capable of resuming a task quickly and precisely from the same point of execution when a computer system restarts power after suspending power supply to its components to save power.

2. Description of the Related Art

Recent advancements in technologies has resulted in a widespread use of portable or "notebook" type computers designed to have a small size and light weight for portability. An example of portable computer is shown in FIG. 18, in which portable computer 100 has relatively thin body 110 and cover 120, which is coupled to body 110 so that cover 120 can be opened and closed. Cover 120 has shallow case 121. At the bottom of case 121 is a pair of cylindrical protrusions 122 formed integrally within the case. With the pair of protrusions 122 rotatably supported with respect to the body, cover 120 is hinged on body 110, allowing cover 120 to be opened or closed with respect to body 110 in an axis of the protrusions 122. In the central portion of the open side, i.e. back side, of the cover, liquid crystal display or LCD 123 is provided as a display means of the personal computer (hereinafter the cover is generically called LCD120).

Body 110 has a shallow case 111 to which support plate 112 of a given width is attached to cover the rear portion of the upper opening of case 111. At the front portion of the upper opening, keyboard 113 is placed as an input means of the personal computer. At the back edge of keyboard 113, a pair of tongue protrusions 114 is formed integrally with keyboard 113. With the pair of protrusions 114 supported axially with the from edge of support plate 112, keyboard 113 is hinged on plate 112. This allows keyboard 113 to be opened or closed with respect to case 111 within an axis of protrusions 114, and the interior of case 111 is exposed when keyboard 113 is opened. Opening or closing of LCD120 with respect to body 110 and that of keyboard 113 with respect to case 111 is accomplished by two-step operation on open/dose control 115 provided on a side of case 111. Since closing LCD120 or opening keyboard 113 will disable computer 100, mechanical operations such as LCD dose and keyboard open are electrically converted into CPU interrupt factors.

FIG. 19 shows the exposed interior of case 111 with keyboard 113 being opened. At a near central portion of case 111, partition 116 is provided to separate the front portion of case 111 from its rear portion. Partition 116 may be formed of a thin metal plate by a bending process. In the rear portion of case 111, which is enclosed by partition 116, there is accommodated internal circuits (not shown) of the personal computer including CPU, ROM, RAM and system bus. The larger space in front of partition 116 is provided to accommodate expansion devices, such as floppy disk drive (FDD) pack 117 and hard disk drive (HDD) pack 119 and battery pack 118. Provided on a side of partition 116 are connectors (not shown) which comply with respective standards for the internal circuits of portable computer 100 to electrically connect these packs with the circuits.

As a new concept for such portable computer 100, there has been suggested that FDD pack 117 or HDD pack 118 be used exchangeable with other detachable expansion devices. For example, FDD pack 117 could be removed from the space in the front portion of case 111 to substitute CD-ROM drive pack 50. The term CD-ROM (Compact Disk Read Only Memory), as used herein, is meant to be an optical disk of aluminum reflective film type, and particularly a storage medium used only for playback which stores information by making use of the fact that depressions on the surface of the disk cause variation of the intensity or phase-shift of reflected light. Capable of high-density recording, CD-ROM has been used to record a great quantity of information such as text data and program data, as well as audio and image data (including pictures, animation and computer graphics). By incorporating a CD-ROM drive having such data playback function, the portable computer as a new medium (or multimedia) is expected to be widely used in fields including education and entertainment.

One of the purposes for which the portable computer is developed is outdoor use in a portable manner. Typically, power supply is therefore not dependent on a constant AC source, but on a battery pack (particularly NiCd, NiMH or LiIon rechargeable battery), as shown in FIG. 19. However, the battery pack is limited to the type of small size, light weight and short lifetime. Consequently, measures have been taken in recent portable computers for Power Management or Power Save.

One example of power save is "Suspend", which is a state where the computer is powered down to almost all portions except main memory to save power when a predetermined state occurs in which an I/O device activity has not been detected for a certain period of time or dosing of an LCD (cover) is detected. Before the suspend mode is entered, the data necessary for restarting a task, such as the hardware context information including I/O configuration, CPU status and the contents of VRAM, is saved in main memory. On the other hand, the operation for restarting power supply and exiting from the suspend mode is called "Resume". In the resume mode, the data previously saved in main memory is restored to each component to enable a task to be restarted from the same point it was at when the computer was powered down. This series of power management operations is actually executed by a program such as those called PM code (PMC) or Advanced PM (APM), which is a trademark of Astek International.

One challenge encountered in developing a power management technique is to resume a task quickly and from precisely the same point of execution as of interruption upon recovery from the power save mode such as suspend. As described above, the portable computer body (hereinafter called host) saves the system information which was present immediately before suspend, such as the hardware context information including register values of each chip and the contents of VRAM, in main memory to preserve the "same point of execution" for the host. For an expansion device, on the other hand, the only information to be provided when the host enters the suspend mode is "power down". In other words, the host does not consider the status of the expansion device, but considers only itself, that is, whether it has preserved the "same point of execution" to effect power down.

Expansion devices can be divided into ones which have no CPU, e.g. floppy disk drive or FDD, and ones which have a built-in CPU, e.g. hard disk or HDD and CD-ROM drive. Operation of the former type is controlled by a controller circuit provided within the host, such as floppy disk controller or FDC. In such cases, the host could preserve the status of an FDD immediately before transition to suspend, i.e., the "same point of execution", by the managing FDC.

However, the case is different in the expansion device having a built-in CPU. This type of expansion device includes ROM for storing various types of firmware and RAM as the working area of CPU. The host operating system or OS, does not directly control the expansion device, but only issues an instruction in a form of command to the CPU of the expansion device. The CPU of the expansion device interprets the command from the host in accordance with the firmware in ROM and performs actual tasks by using RAM as working area. The host OS is not required to directly control all components within the expansion device, and typically has no such function. In these environments, if the host references only the status of itself at power down, operation results, e.g. the contents of RAM, on the expansion device will be lost, and the lost contents of storage cannot be recovered even if power is supplied again from the host.

From the descriptions above, those skilled in the art will readily appreciate that conventional host computers cannot restart a task from precisely the same point of execution. For example, problems which arise when the status immediately before transition to the suspend mode is lost at the expansion device will now be briefly described with an example of CD-ROM drive.

The RAM at the CD-ROM drive has recorded various information on the disk being inserted. This information includes data allocation information such as Table of Contents or TOC, drive parameters indicating data rates, and audio parameters indicating audio output levels. Among these, the TOC information is necessary for searching recording positions during playback of the disk, and is retained when the disk contents are read into RAM during its insertion until either the disk is removed, or power on reset (POR) is done. Each value of drive and audio parameters is dynamically updated during processing of commands from the host. However, if power supply is suspended only for the convenience of the host, such data in RAM will be lost.

Once this working data in RAM is lost, some disadvantages are found during resume operation. Of these, the TOC information, as with normal Power On Reset (POR), must be read again from the disk. However, the CD-ROM drive has an average access time of as long as 350 milliseconds, requiring seconds or even tens of seconds for reading the TOC information. (The compact disk usually manages information for each session. The TOC is provided for every session and recorded in the Lead-In at the beginning of each session. The TOG has a size of 512 bytes per session. For a disk which consists of multiple sessions, the time required for the reading operation will be longer as the number of TOCs increases.) In addition, drive and audio parameters must be specified again, as with normal POR. In such case, the context of the task is destroyed, e.g. the disk is played back with a different audio level. This gives the user a sense of incompatibility. Briefly, playback of the CD-ROM is not restarted from the same point of execution. Similar problems might arise during wake-up after hibernation. (For details of the hibernation technique for computer systems, refer to Japanese patent application 5-184186.)

With its high capacity, the CD-ROM, among others, is often used for providing long programs such as role-playing games, and the user is likely to dose the LCD many times to stop a game until the program ends. Thus, the problem of the resume mode, i.e. restarting a task quickly from the same point of execution, becomes more severe.

Such problems during the resume mode, however, are unlikely to occur with the HDD since its average access time is relatively short, approximately 12 milliseconds. For the magneto optical (MO) disk drive, the average access time is slightly longer at 32 milliseconds at most, the problem of resuming being as severe as for the CD-ROM drive.

From the foregoing descriptions, it should be readily apparent to those skilled in the art that there is required information for restarting a task from the suspend mode at the host, and similarly, that there is also required information for restarting the task at an expansion device, especially one having its own CPU. Moreover, it should also be apparent to those skilled in the art that the host cannot control all the information required by the device for resuming. However, if no provision is available for managing such information at the expansion device, a longer period of time will be necessary for restarting a task and the context of the task will be lost.

SUMMARY OF THE INVENTION

It is therefore one object of the present invention to provide an expansion device detachably installed into a computer system (host) and capable of responding quickly and accurately to a series of operations for power management at the host.

It is another object of the present invention to provide an environment for a portable computer system wherein the expansion device itself saves the information which is required during resume operation and cannot be managed at the host when the suspend mode is entered, thereby allowing a task to be restarted quickly and from precisely the same point of execution during resume.

According to the present invention, an expansion device detachably installed into a computer system is provided. The expansion device comprising central processing means for controlling the operation of said expansion device; a first memory, which is volatile, used as a working area by said central processing means in handling tasks; interface means for communicating with said computer system; means for supplying power to each element in said expansion device; and second data saving means, which is non-volatile and write-enable, for saving the context information held by said interface means and the data stored in said a first memory in response to a request from said computer system via said interface means.

The present invention further provides a method for controlling an expansion device detachably installed into a computer system, and having central processing means for controlling the operation of said expansion device, a first memory, which is volatile, used as a working area by said central processing means in handling task, interface means for communicating with said computer system, means for supplying power to each element in said expansion device, and second data saving means, which is non-volatile and write-enable, for saving the context information held by said interface means and the data stored in said a first memory. The method comprising the steps of receiving a prior notification of powering down from said computer system; saving in said second data saving means the context information held by said interface means and the data stored in said a first memory in response to said notification; and notifying said computer system of the completion of said saving step.

The method further comprising the steps of receiving an instruction from said computer system when power supply is restarted; restoring the data being saved by said second data saving means to said interface means and said a first memory in response to said instruction; and notifying said computer system of the completion of said restoring step.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
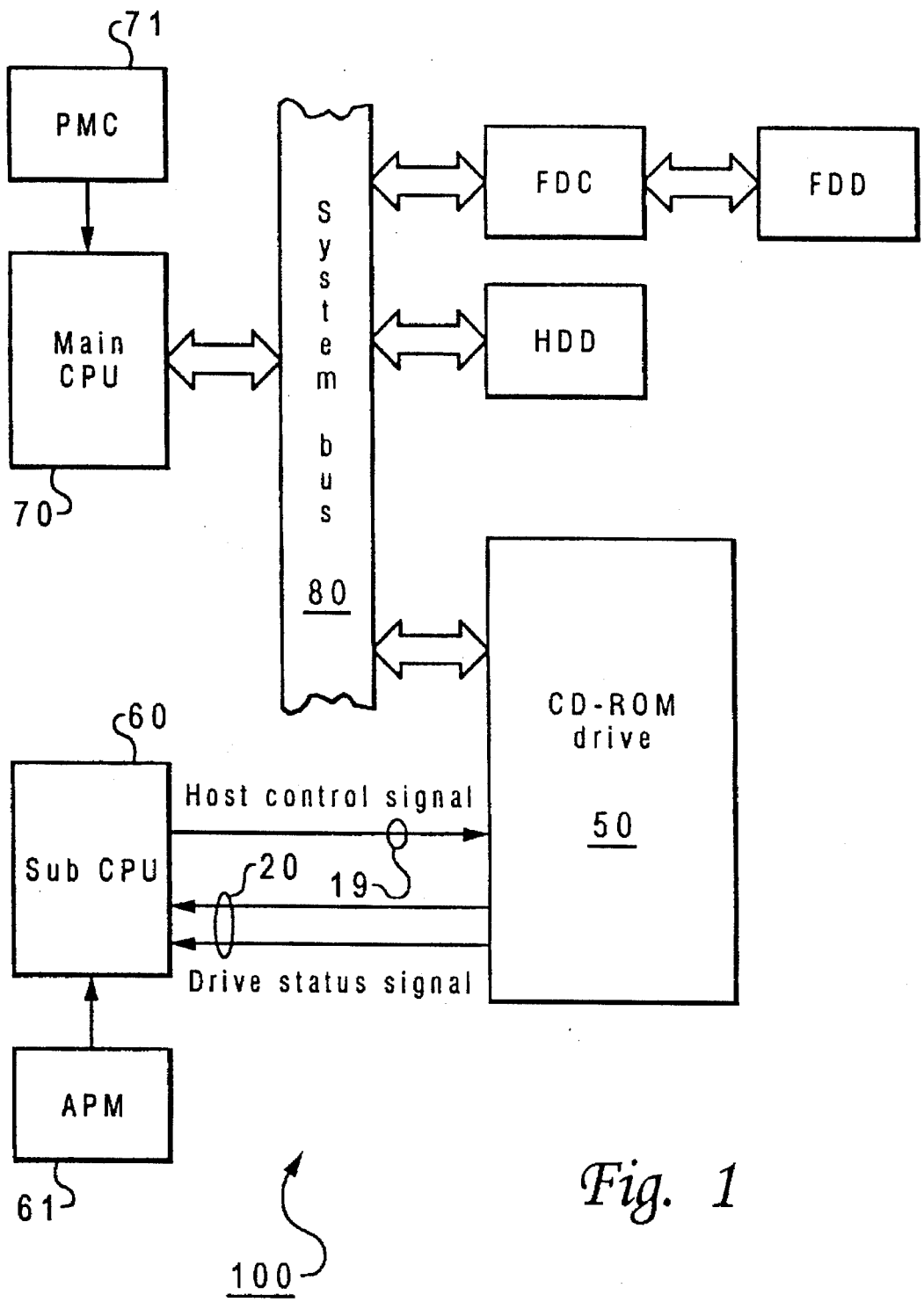
FIG. 1 depicts a block diagram of a computer system in which the present invention is practiced, in accordance with a preferred embodiment of the present invention.

A preferred embodiment of the present invention will now be explained under the following headings:
A. Organization of a portable computer system
B. Hardware organization of a CD-ROM drive
C. Operation modes of the CD-ROM drive
C.1. Active mode
C.2. Idle mode
C.3. Standby mode
C.4. Sleep mode
C.5. Suspend mode
D. Procedure of transition to respective operation modes of CD-ROM drive
D.1. Normal power on reset (POR)
D.1.1. Processing at the host
D.1.2. Processing at the CD-ROM drive
D.2. Transition to sleep mode using an internal timer of the drive
D.3. Transition to sleep mode upon request from the host
D.4. Return from sleep mode (wake-up)
D.5. Transition from active, idle and standby to suspend mode
D.6. Transition from sleep to suspend mode
D.7. Recovery from suspend mode (resume)
E. Timing diagram of the operation of host control and drive status signals
E.1. Transition from active, idle and standby to sleep mode
E.2. Wake-up from sleep mode
E.3. Transition from active, idle and standby to suspend mode E.4. Transition from sleep to suspend mode
E.5. Resume from suspend mode
F. Application to magneto optical disk A. Organization of a Portable Computer System FIG. 1 is a simplified partial block diagram illustrating the hardware organization of portable computer 100 (or a diagram required for describing the operation of power management at an expansion device such as a CD-ROM drive). To build a computer system, many other components (not shown) are actually required. However, such components are well known to those skilled in the art and not shown herein for the sake of simplicity of description.

In FIG. 1, main CPU 70 is electrically connected with each unit within the system via system bus 80 so that it controls the operation of the whole system 1043. Sub CPU 60 is provided to support main CPU 70 in power management. Within the system shown in FIG. 1, main CPU 70, sub CPU 60 and system bus 80 should be considered to make up a host. Also, connected to system bus 80 are expansion devices such as a FDD and a HDD.

CD-ROM drive (hereinafter also referred to as drive) 50 is connected to main CPU 70 through system bus 80 so that it can send to or receive commands from the host. Drive 50 is also connected with sub CPU 60 through host Control Signal (hereinafter also referred to as CS) 19 and two drive Status Signals (also called SS1 and SS2) 20. The function of signals 19 and 20 will be later described.

At the host, when a specified event indicating that a task cannot continue, such as "LCD dose", "keyboard open", and "battery discharged", is detected, main CPU 70 is interrupted to enter the suspend mode. There are two types of requests from the host to drive 50 for transition to the suspend mode. In one type, a suspend request is raised under control of PM code (PMC) 71. In this case, main CPU 70 requests suspend from drive 50 by using a command via system bus 80. In another type of transition request, a suspend request arises under control of APM 61. In this case, sub CPU 60 requests suspend from CPU 10 (see FIG. 2) in drive 50 via host control signal 19. (The transfer of a suspend request using a host control signal will be described later.)

PMC 71 can be the one which is loaded from system ROM (not shown) during POR and can be the other which is incorporated in the operating system (OS). What is important in the present invention, however, is not the operation of power management itself by PMC or APM at the host, but that a suspend request is made by the host to drive 50 in a form of either command or control signal.

B. Hardware Organization of a CD-ROM Drive

Figure 2:
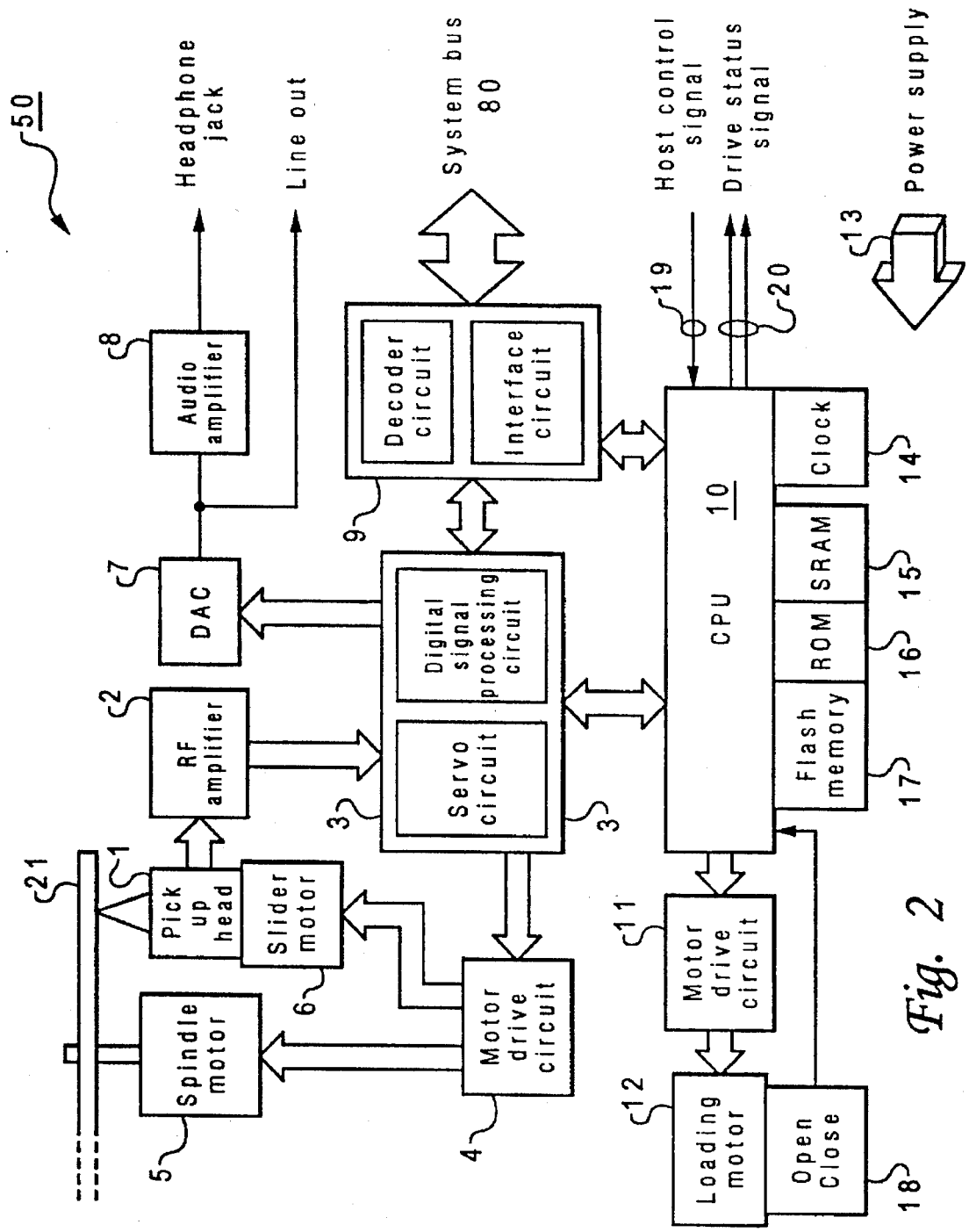
FIG. 2 is a block diagram of a CD-ROM drive in which the present invention is practiced, in accordance with a preferred embodiment of the present invention.

FIG. 2 is a detailed block diagram illustrating the hardware organization of CD-ROM drive 50 shown in FIG. 1. It should be understood by the following description that the present invention is implemented by using CD-ROM drive 50.

Disk (CD) 21 as a storage medium is rotatable mounted onto spindle motor 5. Beneath the surface of disk 21 is located Pick Up Head 1. Motor drive circuit 4 controls the rotation of spindle motor 5 so that the track of disk 21 rotates at a constant linear velocity (CLV) with respect to pick up head 1. Pick up head 1 is used for reading data using the output of a laser to disk 21 and reception of reflected light, and is mounted onto slider motor 6 which is movable in the radial direction of disk 21.

The output signal from pick up head 1 is input to servo circuit/digital signal processing circuit 3 via RF amplifier 2 for both position control of pick up head 1 and data processing. For position control, a control system, which is made up of servo circuit 3 and motor drive circuit 4, controls synchronous driving of spindle motor 5 and slider motor 6 based on that output signal to enable pick up head 1 to access disk 21. Pick up head 1 is supported by a two-axis device (not shown) which is capable of precision driving, focusing and tracking. For data processing, the output signal is processed by digital signal processing circuit (DSP) 3. To send a processed digital signal to the host, digital/analog converter circuit (DAC) 7 converts the signal into an analog for output. For output to a headphone, the signal is output via DAC 7 and audio amplifier circuit 8. When the signal is output as digital data to the host, decoder circuit 9 decodes the signal to send it to system bus 80. The servo circuit and DSP are shown with identical reference numeral 3, and may be of the same chip or of separate chips.

A tray (not shown) for mechanically mounting disk 21 is coupled with loading motor 12 in a power-transferrable manner. Motor chive circuit 11 controls loading motor 12 in response to a signal from eject button 18, which is used to indicate tray open or close operation or a request from CPU 10 (or request from the host via CPU 10), thus allowing replacement of disk 21.

CPU 10 is a controller means for controlling the operation of each unit within CD-ROM drive 50. CPU 10 includes clock 14 for synchronizing operations, ROM 16, RAM 15 and Electrically Erasable Programmable ROM (EEPROM) 17.

ROM 16 is a read-only memory with its write data determined during manufacture and is used to store various types of firmware. The actual firmware to be stored is used for self test performed by drive 50 during startup (POR), command processing for interpreting commands sent from the host (also called host command), checking drive status such as disk in/out and tray open/close, or mechanical control for controlling the drive mechanism such as tray eject.

RAM 15 is a first memory used by CPU 10 as a working area and, as described in the Description of the Related Art above, is used to store various information received from the disk 21 inserted (e.g. allocation information such as TOC, drive parameters indicating data rates, audio parameters indicating audio output levels). There are Dynamic RAM (DRAM) which requires refreshing of stored data and Static RAM (SRAM) which does not require refreshing. In this embodiment, SRAM is preferred (the reason of which will be described later).

EEPROM 17 is a write-enable non-volatile semiconductor memory and acts as second data saving means, details of which are described below. There are two types of EEPROM: in one type, data can be erased only per bit, and in so-called flash memory of another type, data can be fully erased by sector. Although either type can be used as second data saving means relative to the present invention, the latter allows more efficient operations.

Interface circuit 9 is used to control the flow of data between the host and drive 50 and includes a control register, command register, status register, error register and data register. Of these, the status register includes a field for retaining the current operation mode of drive 50 (operation modes of drive 50 will be described in section C) and a Busy Flag for presenting an activity of drive 50 to the host. The activity of drive 50 can be a Ready state in which a host command can be executed immediately or a Busy state in which no host command can be accepted due to processing of a task. The host OS can recognize the status of drive 50 by polling this status register. Interface and decoding circuits are shown in FIG. 2 with identical reference numeral 9, and may be configured with the same chip or separate chips.

As described above, communications between CPU 10 of drive 50 and the host are performed with commands sent or received via interface circuit 9, and also with host control signal 19 and drive status signal 20. Host control signal 19 is a signal used by the host to communicate its intention to drive 50 and provided for two purposes in this embodiment. One is to send a request from the host for changing operational mode. Another is to initiate a hardware interrupt to CPU 10, while clock 14 is halted. As described in section C, CD-ROM drive 50 relative to the present invention can enter an operation mode of sleep or suspend when clock 14 of CPU 10 is in a halt state. Halted clock 14 causes interface circuit 9 to stop and accept no command. Therefore, interruption of CPU 10 by host control signal 19 activates clock 14.

Conversely, drive status signal 20 is a signal used by drive 50 to communicate its intention to the host, and consists of two signal lines SS1 and SS2, as described above. SS1 indicates the activity of drive 50 with a High or Low level of signal. (In this embodiment, a busy state causes SS1 to go to a low level.) SS2 is used to notify the host that drive 50 moves voluntarily from active, idle or standby to sleep mode (see section D.2).

Though drive 50 is supplied with power from the host, as shown with an arrow of reference numeral 13, detailed power lines are not shown. It should be noted, however, that turning on or off this power supply 13 is caused by normal power on (POR) or power off at the host and also is dependent upon suspend/resume operation. Operations of host control signal 19, drive status signal 20 and power supply 13 will be described in detail in section E.

C. Operational Modes of the CD-ROM Drive

CD-ROM drive 50 pertinent to the present invention has five operation modes: Active, Idle, Standby, Sleep and Suspend.

Figure 3:
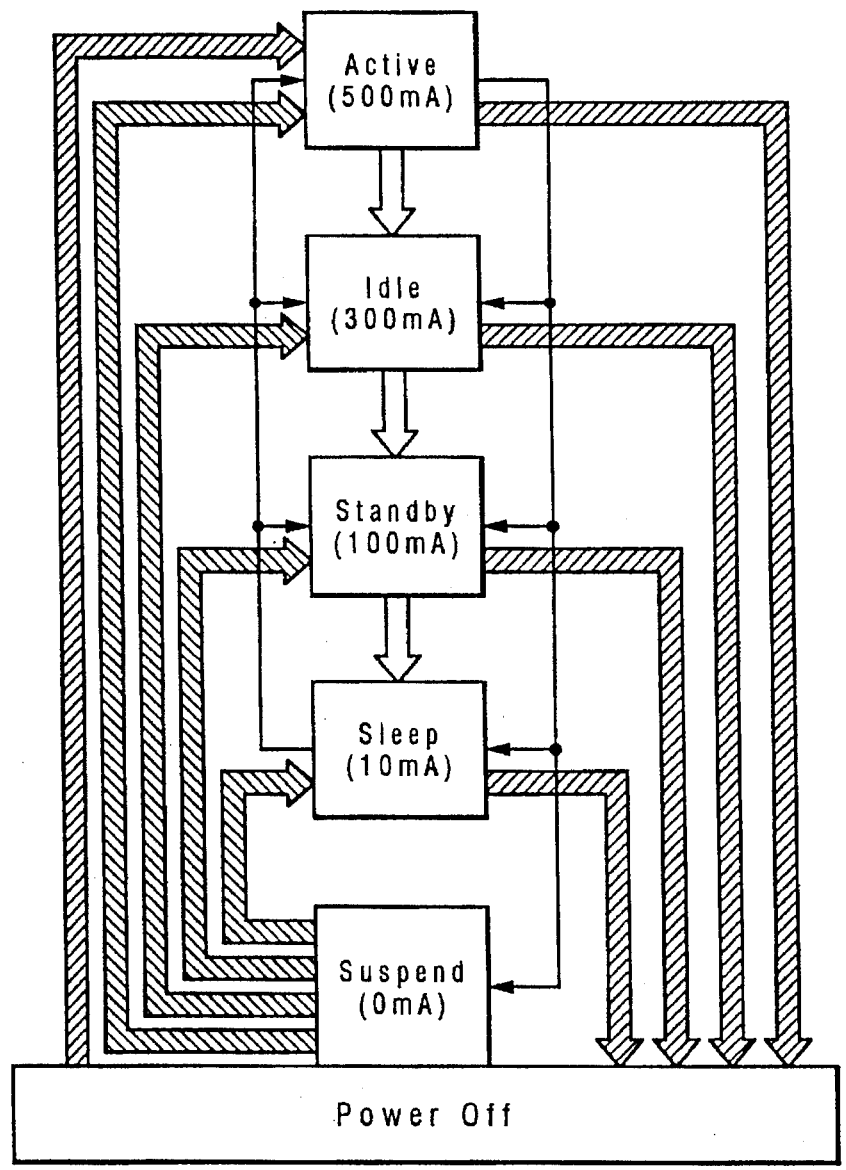
FIG. 3 depicts a schematic illustration which shows the operational modes of a CD-ROM drive, in accordance with a preferred embodiment of the present invention.

FIG. 3 schematically shows each operation mode and transitions between them. Transition between each mode is triggered by an internal timer of drive 50, a request by a host command or host control signal, application of power from the host for resume, or normal application or suspension of power (POR) by the host. In FIG. 3, each transition is represented by an arrow indicating a trigger. The procedure of transition to each operation mode depends on its trigger and will be described in detail in section D.

Figures 4, 12:
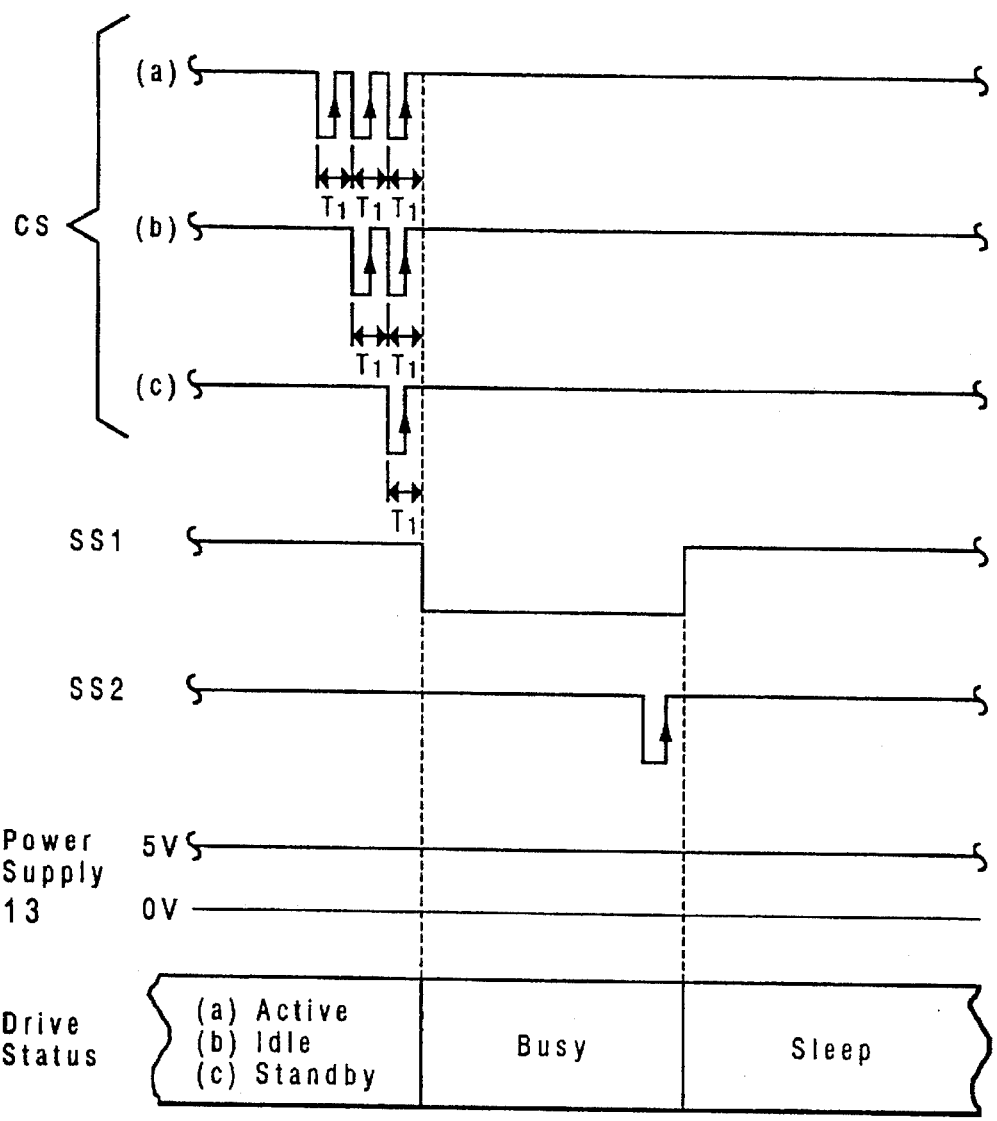
FIG. 4 is a schematic illustration which shows activities in the CD-ROM drive in each operational mode, in accordance with the preferred embodiment of the present invention.
FIG. 12 illustrates operation of host control and drive status signals, and particularly is a timing diagram of each signal when a sleep request by the host control signal causes transition from active, idle or standby to sleep mode, in accordance with a preferred embodiment of the present invention.

The state of operation of each mechanism and electrical circuit within drive 50 varies between operation modes, and their relationship is shown in FIG. 4. In the table shown in FIG. 4, column headings indicate components of drive 50 (the numbers in column headings correspond to reference numerals in FIG. 2), and row headings indicate operation modes. Characters A (Active), I (Inactive) and D (Disabled) in each column of the table denote the activity state in the corresponding operation mode of each component, and the activity level descends in this order; A, I and D.

It should be readily understood in FIGS. 3 and 4 that each component within drive 50 becomes more inactive as the operation mode moves downward. It should also be apparent to those skilled in the art that the more drive 50 becomes inactive, the more power reduction is achieved. In other words, as the operation mode changes from active to idle, standby, sleep and suspend, drive 50 goes deeper into sleep. Each operation mode will now be described.

C.1. Active Mode

Active mode is a state in which power (5 V, 500 mA, in this embodiment) is normally supplied from the host and the drive is currently executing a self test or host command, or the host command can be immediately executed.

C.2. Idle Mode

In idle mode, spindle motor 5 is rotating, but the laser output of pick up head 1 will stop. This causes output to RF amplifier 2 to be cut off. Then servo control, i.e. position control for pick up head 1, on slider motor 6 and the two-axis device is substantially interrupted. The effect of power save on laser output and servo control is a decrease of power consumption to 300 mA.

When a host command is issued in this mode, the active mode can be entered with only a time delay necessary for restarting servo control.

C.3. Standby Mode

In standby mode, the rotation of spindle motor 5 will also stop, i.e. motor drive circuit 4 and spindle motor 5 become more Inactive. This results in decrease in power consumption to 100 mA.

When a host command is issued in this mode, the time required for spin-up of spindle motor 5 and restarting servo control allows returning to the active mode. In active, idle and standby modes, drive 50 is in a state in which it can service the host command immediately.

C.4. Sleep Mode

Briefly, sleep mode is a state where dock 14 of CPU 10 is halted and all mechanisms and electrical circuits of drive 50 are in a completely halted state (Disabled). In this mode, power is still supplied from the host, but its consumption is only a small leakage current (10 mA), thus leading to a significant power savings.

When dock 14 of CPU 10 is halted, refreshing of memory will be disabled. Therefore, if RAM 15 provided in CPU 10 is dynamic RAM, its contents are lost. This embodiment, however, employs static RAM as RAM 15, which will retain its contents only with the supply of the aforementioned leakage current, even in the sleep mode.

Since halting of dock 14 causes interface circuit 9 to be in a completely halted state (Disabled), the command issued by the host will not be processed in this mode. Therefore, the host must issue a request using host control signal 19 instead of using a command. (Specifically, a request is made for interrupt of CPU 10 to activate dock 14. Refer to section E for details.)

One of the features of power savings which is achieved in idle, standby and sleep modes is that power supply 13 itself is not mined on or off to each electrical circuit within drive 50, but power savings is obtained to the extent of approximately two percent of that in the active mode, i.e. 500 mA to 10 mA, by sequentially forcing each control system into a substantially halted state. In other words, it is not necessary for the host or drive 50 to exercise frequent control over power supply to each electrical circuit to effect these power save modes.

C.5. Suspend Mode

Suspend mode, if viewed from the host, is to stop power supply to almost all units except the main memory after the data required for restarting a task has been saved in the main memory. In suspend mode, therefore, the power supplied to CD-ROM drive 50 will be 0 mA. h this sense, the suspend mode, when viewed from the drive, is not different from a state of normal power off. In suspend mode, the contents of each register and RAM 15 within interface circuit 9 of drive 50 are lost due to volatility.

One of the objectives of the present invention is to effect the behavior of drive 50 during transition to the suspend mode, i.e. the state within drive 50, immediately before power down, which will be described in detail in section D.

D. Procedure of Transition to Respective Operational Modes of the CD-ROM Drive

D.1. Normal Power on Reset (POR)

Figure 5:
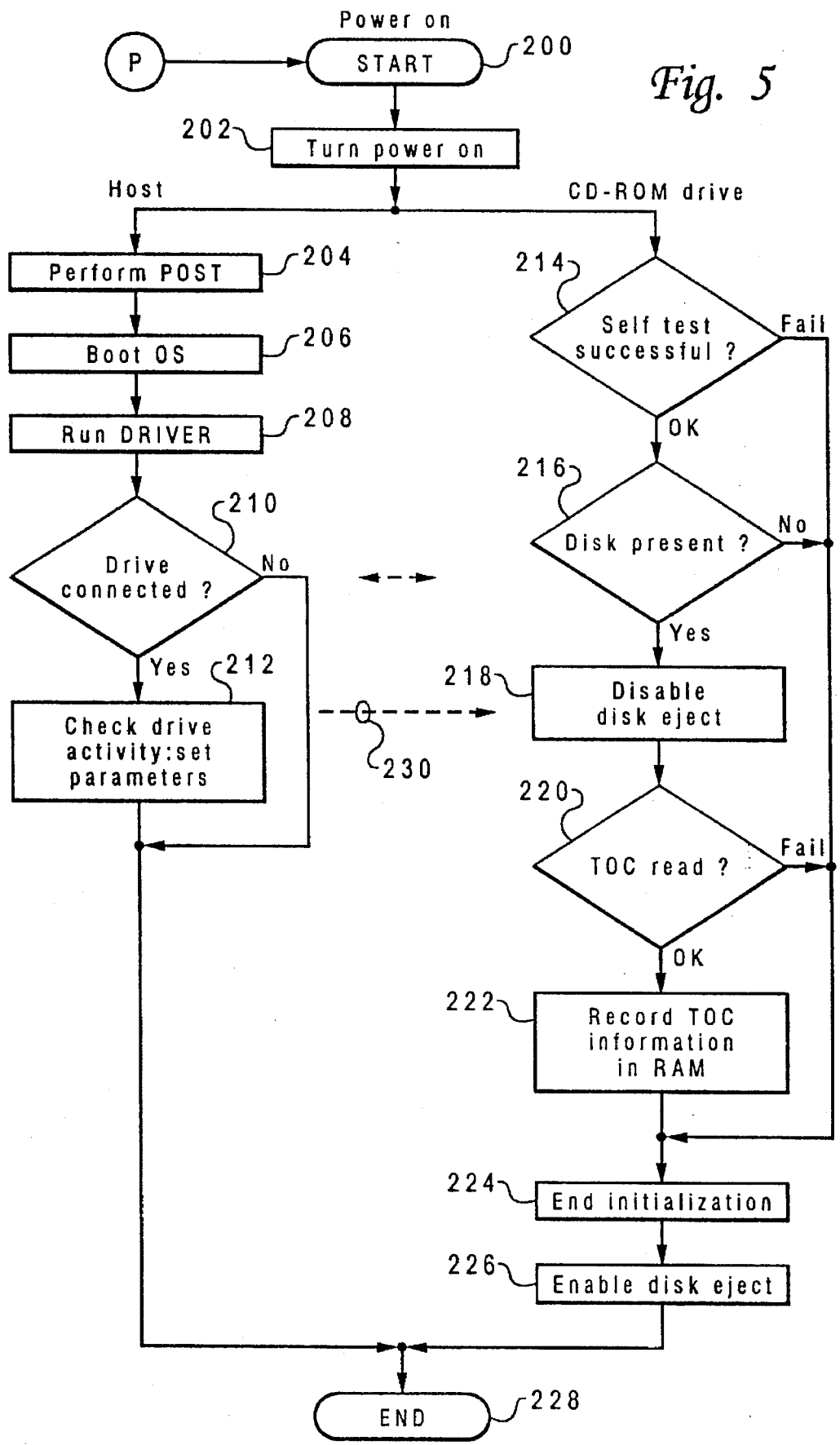
FIG. 5 illustrates transition of the operation modes of CD-ROM drive pertinent to an embodiment of the present invention, and specifically is a flow diagram illustrating a processing procedure at normal power on (POR) by the host, in accordance with a preferred embodiment of the present invention.

FIG. 5 shows a flow diagram of normal power on reset procedure (POR). The expansion device is illustrated as CD-ROM drive 50 pertinent to the present invention, as shown in FIG. 5. When power is applied at the host (step 202), the host and drive 50 performs the following processing in parallel.

D.1.1. Processing at the Host

At the host, Power on Self Test (POST) is performed at step 204, and the operating system (OS) is loaded to allow the computer system to be operative at step 206. Then, a Device Driver is run it step 208. Typically, the device driver to be used has been specified in the "config.sys" file. At decision block 210, a command is sent to the interface circuit at the expansion device (including drive 50) to determine whether connection has actually been established. The expansion device which fails in connection is then treated as being disconnected, as shown with a No branch of decision block 210. When, on the other hand, this attempt has been successful, a further command is sent to the expansion device to confirm drive activity or specify parameters at step 212, as shown with a Yes branch of decision block 210. Drive activity refers to a state whether drive 50 is currently processing a task (i.e. busy state) or not, and can be detected by the signal level of drive status signal SS1 (refer to previous description and section E). Parameters include audio (audio output levels) and drive parameters (set time of the power-save timer) (see section D.2), rotation speed of the spindle motor and data rate described above. The device driver, when specifying these parameters, notifies drive 50 of each specified value, as shown with arrow 230 (such notification is not made if drive 50 itself specifies default values).

D.1.2. Processing at the CD-ROM Drive

At CD-ROM drive 50, first, a self diagnostic test is performed at step 214. The firmware for self test is stored in ROM 16 of drive 50, as described above. If the self test fails, steps 216, 218, 220 and 222 are skipped to end initialization (step 224). When, on the other hand, the self test has been successful, step 216 is entered to determine if a disk has already been inserted into the disk tray. If not, steps 218, 220 and 222 are skipped to end initialization (step 224). If the disk has already been inserted, step 218 is entered to disable ejection of the disk for disk access (specifically, the eject function of the disk tray is killed). Next, at step 220, the disk is accessed and an attempt is made to read the TOC information. If the read attempt fails, step 222 is skipped to end initialization (step 224).

If read operation is successful, the TOC information is recorded in RAM 15 within drive 50 at step 222 to terminate the process for initialization (step 224). The TOG information being recorded is retained in RAM 15 until the disk is replaced or power on reset (POR). The TOG information is used for illegal request error processing or searching recording positions for which a disk access request occurs (in the case of music CDs). When initialization is ended, disk eject is enabled at step 226. When the processing described above ends at the host and drive 50 (step 228), an active state is entered. Drive 50, therefore, is then in a state that it can execute a host command immediately.

D.2. Transition to Sleep Mode Using an Internal Timer of the Drive

Figure 6:
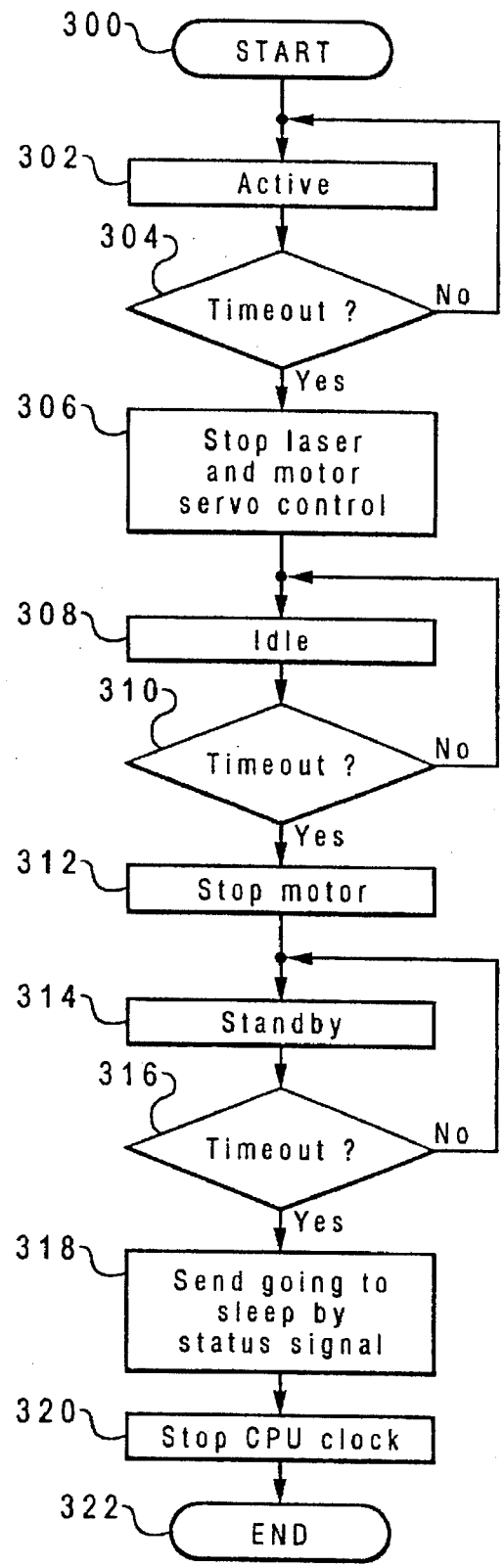
FIG. 6 illustrates transition of the operation modes of CD-ROM drive pertinent to an embodiment of the present invention, and specifically is a flow diagram illustrating a processing procedure for transition to sleep by an internal timer of drive, in accordance with a preferred embodiment of the present invention.

CD-ROM drive 50 pertinent to the invention can voluntarily enter the sleep mode without receiving a request from the host. Specifically, the internal timer (not shown in FIG. 2) of drive 50 monitors the elapsed time from the last disk access, and drive 50, whenever a given period of time is exceeded, automatically enters the idle, standby or sleep mode. FIG. 6 shows a procedure for transition to sleep using the internal timer.

Until a given period is elapsed from the last disk access, the active mode is maintained by the loop formed of steps 302 and 304. When a given period of time passes, laser output of pick up head 1 is stopped and servo control such as for slider motor 6 (step 306) is set to halt to enter the idle mode (step 308). Details of the idle mode has been described in section C.2 above. During the time between the last disk access and the next given period of time, the idle mode is maintained by the loop formed of steps 308 and 310.

When the next given period of time passes, the rotation of spindle motor 5 stops (step 312) and the standby mode is entered (step 314). Refer to section C.3 above for details of this mode. During the time between the last disk access and the third predetermined period of time, the standby mode is maintained by the loop formed of steps 314 and 316.

When the fourth predetermined time passes, step 320 is taken and dock 14 of CPU 10 is halted to enter the sleep mode. Refer to section C.4 above for details of the sleep mode. Since halted dock 14 causes interface circuit 9 to stop, transition of drive 50 to the sleep mode becomes invisible to the host. (In each mode from active to standby, the host can recognize the mode of drive 50 by polling the status register within interface circuit 9). The OS of the host, therefore, can recognize the operation mode of drive 50, as described above.) Then, drive 50 notifies the host via drive status signal SS2 of entering the sleep mode before the actual transition (step 318). For details of notification using drive status signal SS2, refer to section E. Thus, CD-ROM drive 50 can achieve power save by itself going deep into sleep without waiting for a request from the host. Each predetermined time period before transition to each mode (steps 304, 310 and 316) may be a previously specified value before shipment or programmable by the user at the execution of POST.

D.3. Transition to Sleep Mode Upon Request From the Host

Figure 7:
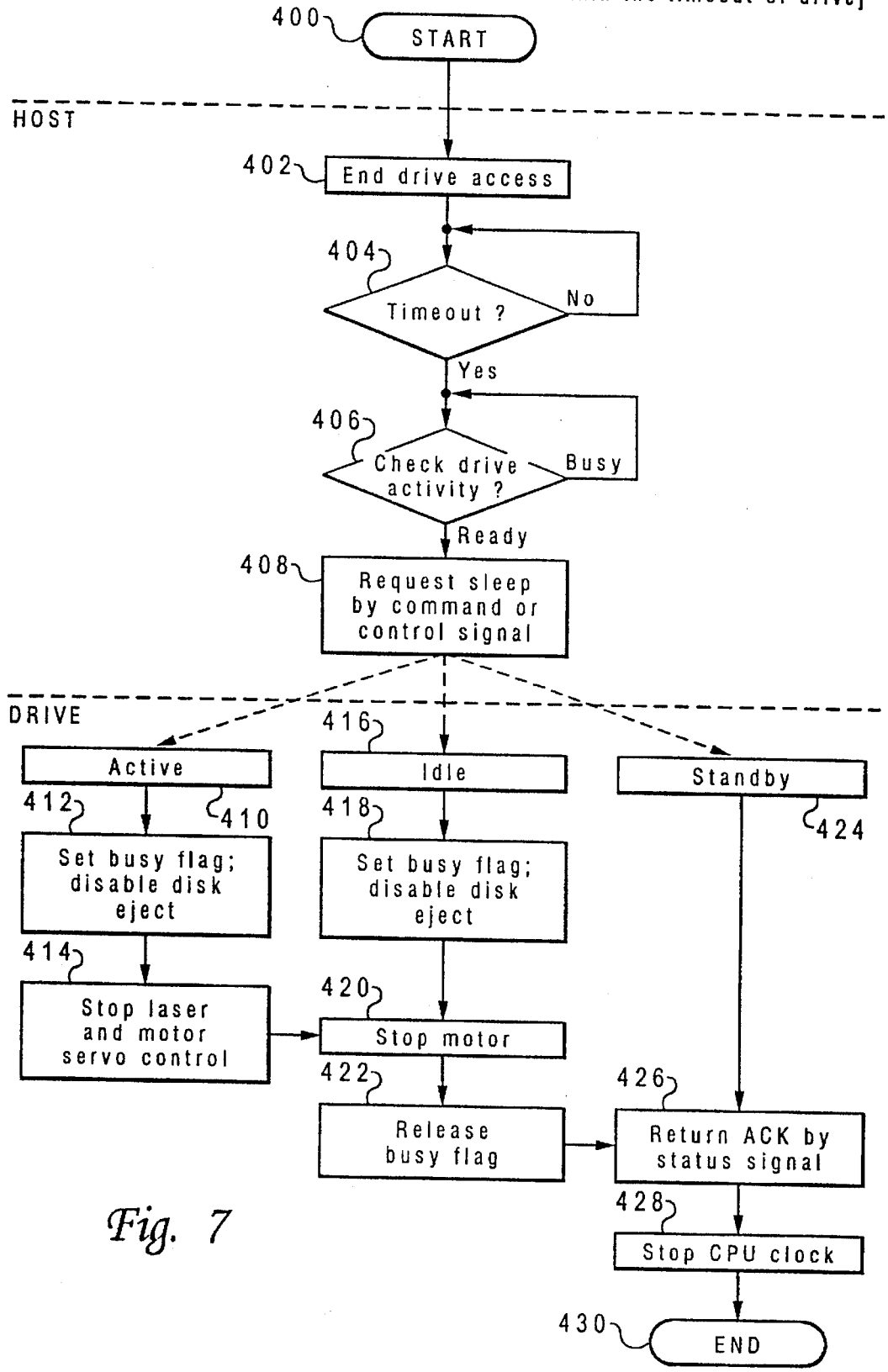
FIG. 7 illustrates transition of the operation modes of CD-ROM drive pertinent to an embodiment of the present invention, and specifically is a flow diagram illustrating a processing procedure for transition to sleep by an instruction of the host, in accordance with a preferred embodiment of the present invention.

In contrast to D.2, the drive may change from the active, idle or standby to sleep mode upon request by a host command or host control signal 19. FIG. 7 shows a procedure of transition to sleep by an instruction of the host. The host uses its internal timer (not shown in FIG. 1) to monitor the elapsed time from the last drive access (steps 402 and 404). It determines the activity of drive 50 when a predetermined time period passes from the last drive access (step 406). This determination is made by checking the busy flag of interface circuit 9 Or the signal level of drive status signal SS1, as described above. If the activity is determined as a busy state, the host waits until drive 50 becomes a ready state. When the ready state is entered, the host sends a sleep request command to drive 50 via system bus 80 or requests sleep using host control signal 19 (step 408). For details of sleep request by host control signal 19, refer to section E. Drive 50, upon receiving the sleep request from the host, performs a procedure dependent on the current operation mode.

Drive 50, when it enters the active mode, sets at step 412 the busy flag of interface circuit 9 and disables the ejection of the disk, i.e. sets a state in which other task requests are negated. Next, at step 414, drive 50 stops servo control for the laser output of pick up head 1, slider motor 6 and the like to enter the idle state before proceeding to step 420.

When drive 50 is in the idle mode, it first at step 416 sets the busy flag and disables the ejection of the disk (equivalent to step 412). Next at step 420 it stops rotation of spindle motor 5 to enter a standby state. At this time, drive 50 has completed preparation for transition to the sleep mode, and releases the busy flag which has been set previously (step 422). Then, step 426 is entered.

If drive 50 is already in the standby mode and if it has gone to the standby mode with the procedure of steps 410 to 422, drive 50 at step 426 first sends back an Acknowledge signal of transition to the sleep mode through drive status signal SS2 (equivalent to step 318). Next, drive 50 stops clock 14 of CPU 10 to go to the sleep mode (step 428) and the process is ended (step 430).

D.4. Return From Sleep Mode (wake-up)

Figure 8:
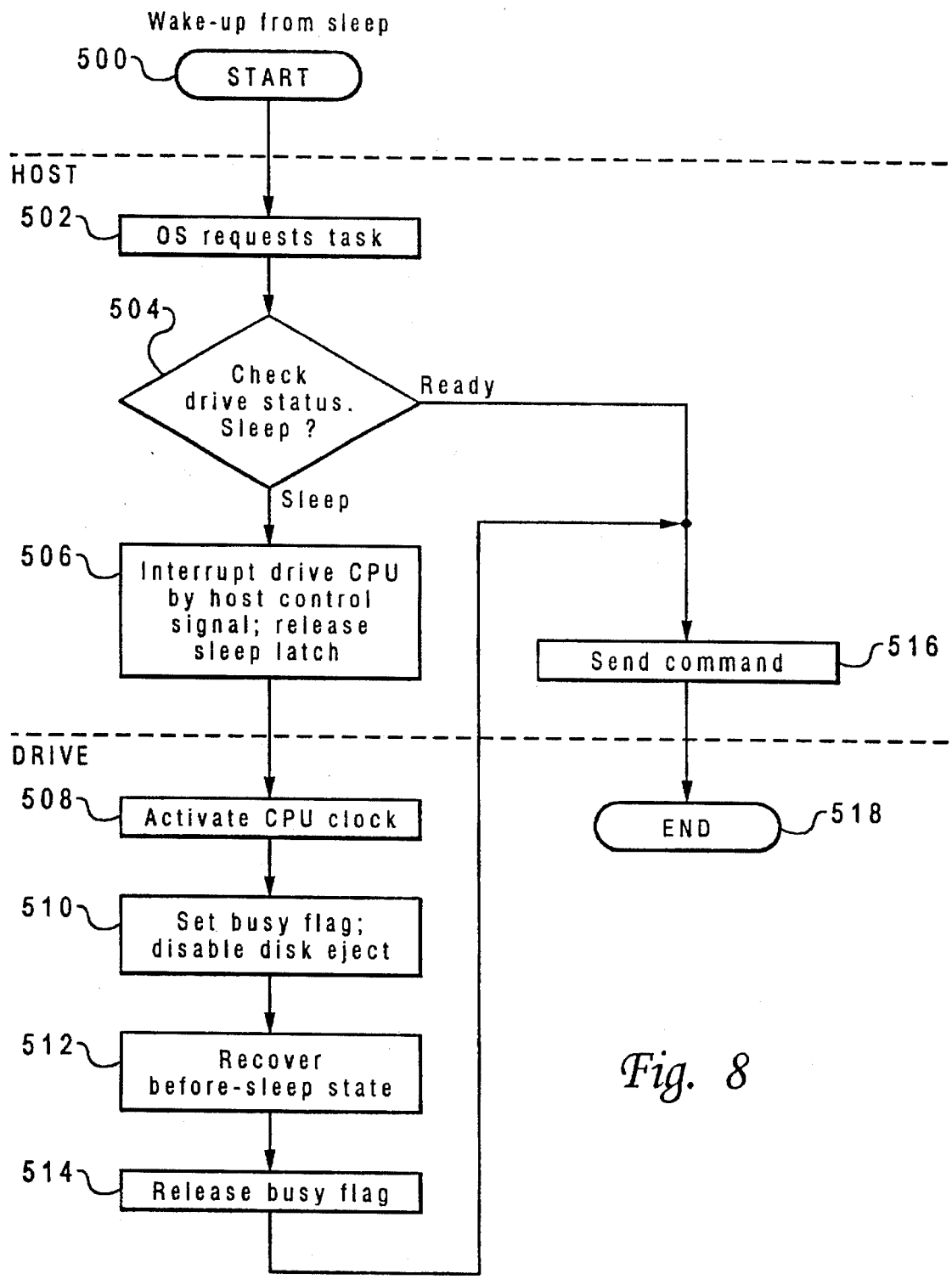
FIG. 8 illustrates transition of the operation modes of CD-ROM drive pertinent to an embodiment of the present invention, and specifically is a flow diagram illustrating a processing procedure for wake-up from sleep, in accordance with a preferred embodiment of the present invention.

Return from the sleep mode of drive 50 is called Wake-up. FIG. 8 shows a procedure for wake-up. A request for wake-up of drive 50 arises by the OS at the host requesting a task from drive 50 at step 502. First, the host determines whether drive 50 is actually in the sleep mode at step 504. The operational mode of drive 50 can be determined by referencing the status register within interface circuit 9 in a mode sequence from active to standby, as described above, but it cannot be determined by interface circuit 9 during the sleep mode. Instead, if the host has latched a notification of transition to sleep (hereinafter called "sleep latch"; see section E) with drive status signal SS2 (steps 318 and 426 described above), the sleep mode is determined. If drive 50 is in either the active, idle or standby mode, a task can be processed immediately (refer to section C), so that the OS sends a command at step 516 and terminates processing at step 518. On the other hand, during the sleep mode, almost all components of drive 50 is in a halt state, in which a command cannot be processed immediately. Then the following procedure is taken. First, the host interrupts CPU 10 of drive 50 by using host control signal 19 and releases the sleep latch at step 506 to activate clock 14 at step 508. Next, drive 50 sets the busy flag at step 508 and disables the ejection of the disk at step 510, to return to the mode prior to sleep at step 512. That is, it returns to the active mode if it was active, the idle mode if it was idle, or the standby mode if it was standby. The operation mode entered before transition to sleep has been stored by the status register within interface circuit 9.

When recovery is completed, the busy flag previously being set is released and the host is notified that command processing has become possible at step 514. Then, the OS issues a command at step 516 and terminates wake-up processing at step 518.

D.5. Transition From Active, Idle and Standby to Suspend Mode

One of the features of the present invention is how drive 50 saves the immediately prior state when the host turns into the suspend mode. This feature will be apparent in this section and section D.6.

Figure 9:
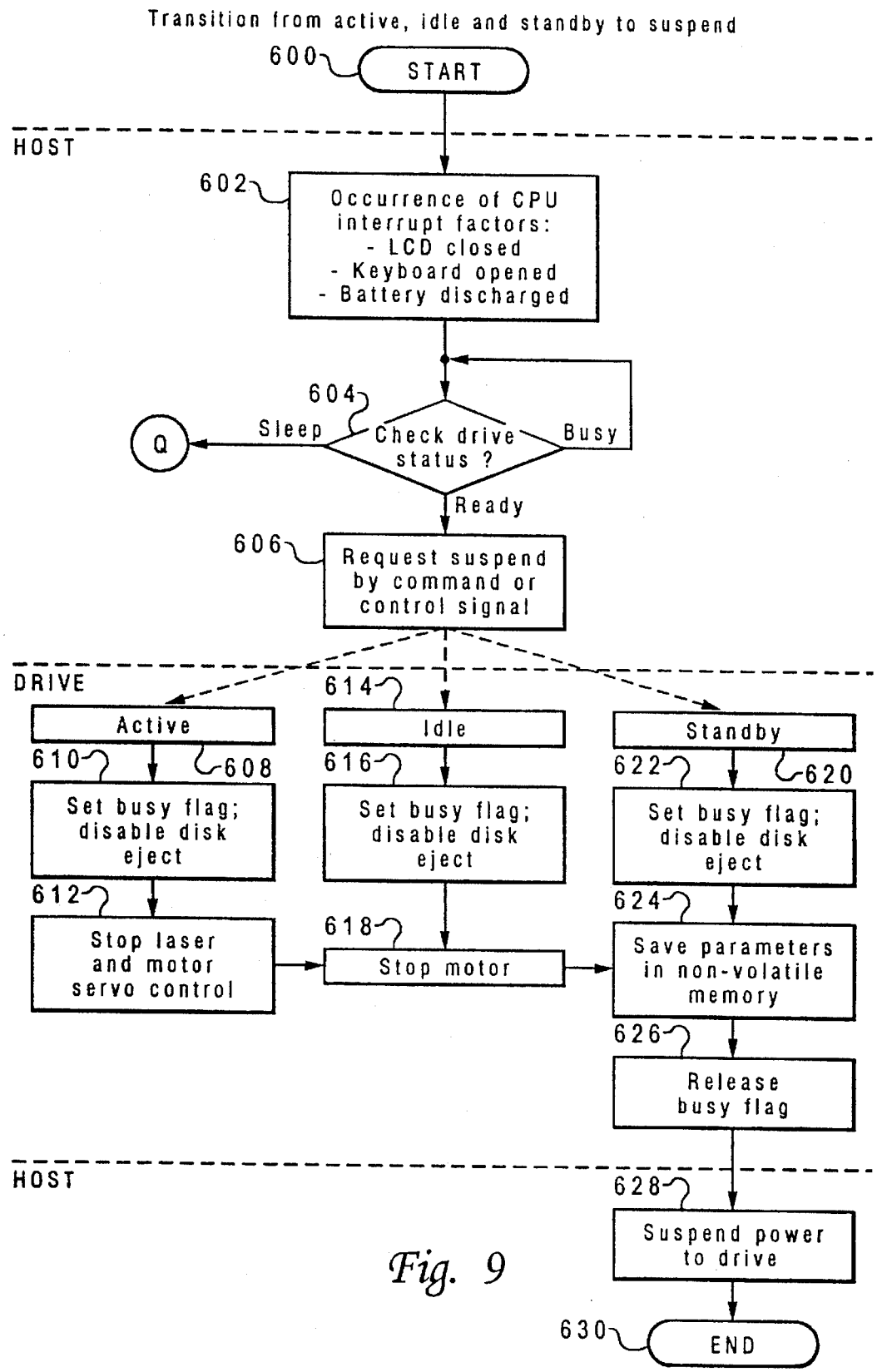
FIG. 9 illustrates transition of the operation modes of CD-ROM drive pertinent to an embodiment of the present invention, and specifically is a flow diagram illustrating a processing procedure for transition from active, idle or standby to suspend mode, in accordance with a preferred embodiment of the present invention.

FIG. 9 shows a procedure for transition from the active, idle or standby to the suspend mode. At the host, when a specified event is detected which indicates a task cannot be continued, such as "LCD120 is closed", "keyboard 113 is opened" and "battery 119 is discharged to a given extent", an interrupt of CPU 70 occurs to enter the suspend mode at step 602. It should be understood that details of processing for the suspend mode is beyond the scope of the present invention and will not be described herein.

Next, the host determines the status of drive 50, i.e. the operation mode and activity of the drive at step 604. If drive 50 is in the sleep mode, a procedure is taken to move from sleep to the suspend mode via branch Q (see FIG. 10 and section D.6). When drive 50 is in a busy state or processing other task, the host waits until the drive becomes ready. If drive 50 becomes ready, the host sends a suspend request to drive 50 in the form of a host command or host control signal 19 at step 606.

Drive 50, upon receiving from the host the suspend request, performs a procedure dependent on the current operation mode. If drive 50 is in the active mode, it first at step 610 sets the busy flag and disables the ejection of the disk. Next, at step 612, it stops the laser output of pick up head 1 and motor servo control to enter the idle state before proceeding to step 618. If drive 50 is in the idle mode, it first sets the busy flag and disables the ejection of the disk at step 616. Next, at step 618, it stops operations such as the rotation of spindle motor 5 to enter the standby state before proceeding to step 624. If drive 50 is already in the standby mode, it sets the busy flag and disables the ejection of the disk at step 622.

Drive 50, when it has completed respective operations of steps 622 and 618, is in a state in which it could accept the suspension of power supply 13 from the host. However, if power is suspended immediately after these steps, the working data stored in RAM 15 (e.g. TOC information, drive and audio parameters) and the contents of each register within interface circuit 9 will be lost, because these storage media are volatile. The problems encountered when these contents are lost are as described in the Description of the Prior Art above. Thus, in this embodiment, the contents of RAM 15 and each register are saved in a non-volatile semiconductor data saving device of flash memory 17 (step 624). In this manner, necessary data is preserved before drive 50 releases the busy flag and notifies the host that preparation for entering the suspend mode is completed (step 626). Next, the host, upon detecting the release of the busy flag, suspends power supply 13 to drive 50 at step 628 and terminates processing for transition to suspend for the entire system (step 630).

D.6. Transition From Sleep to Suspend Mode

Figure 10:
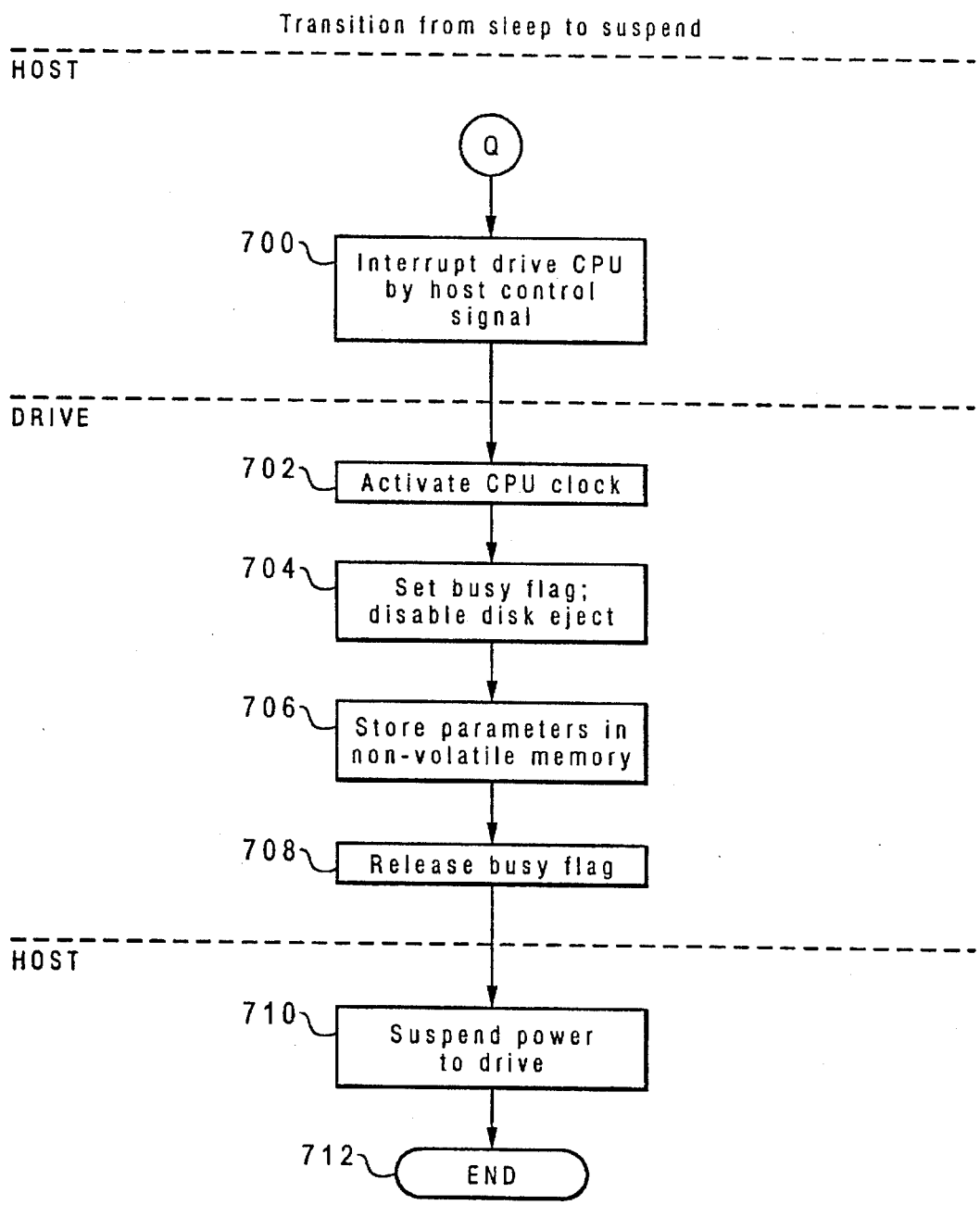
FIG. 10 illustrates transition of the operation modes of CD-ROM drive pertinent to an embodiment of the present invention, and specifically is a flow diagram illustrating a processing procedure for transition from sleep to suspend mode, in accordance with a preferred embodiment of the present invention.

FIG. 10 shows a procedure for transition from the sleep to suspend mode. That is, FIG. 10 illustrates a succeeding procedure of branch Q when drive 50 has been determined to be in the sleep mode at step 604 in FIG. 9.

In the sleep mode, each unit of drive 50 is in a halt state, i.e. the state in which operation cannot be done to save the contents of RAM 15 and each register within interface circuit 9. Therefore, the host interrupts CPU 10 of drive 50 by using host control signal 19 at step 700 and activates clock 14 of CPU 10 at step 702, to recover operation of each unit within drive 50 (actually return to the standby mode).

Then, drive 50 sets the busy flag and disables the ejection of the drive at step 704. At step 706, it saves the contents of RAM 15 and each register of interface circuit 9 in flash memory 17 (equivalent to step 624). Next, drive 50 releases the busy flag and notifies the host of the completion of preparation for transition to suspend at step 708. In response to this notification, the host suspends power supply 13 to drive 50 at step 710 and terminates processing for transition to suspend for the entire system at step 712.

D.7. Recovery From Suspend Mode (resume)

One of the effects of the present invention is that it is possible to provide an environment in which drive 50 can restart a task quickly and from precisely the same point of execution when the host enters a resume state. This effect will be apparent in this section.

Figure 11:
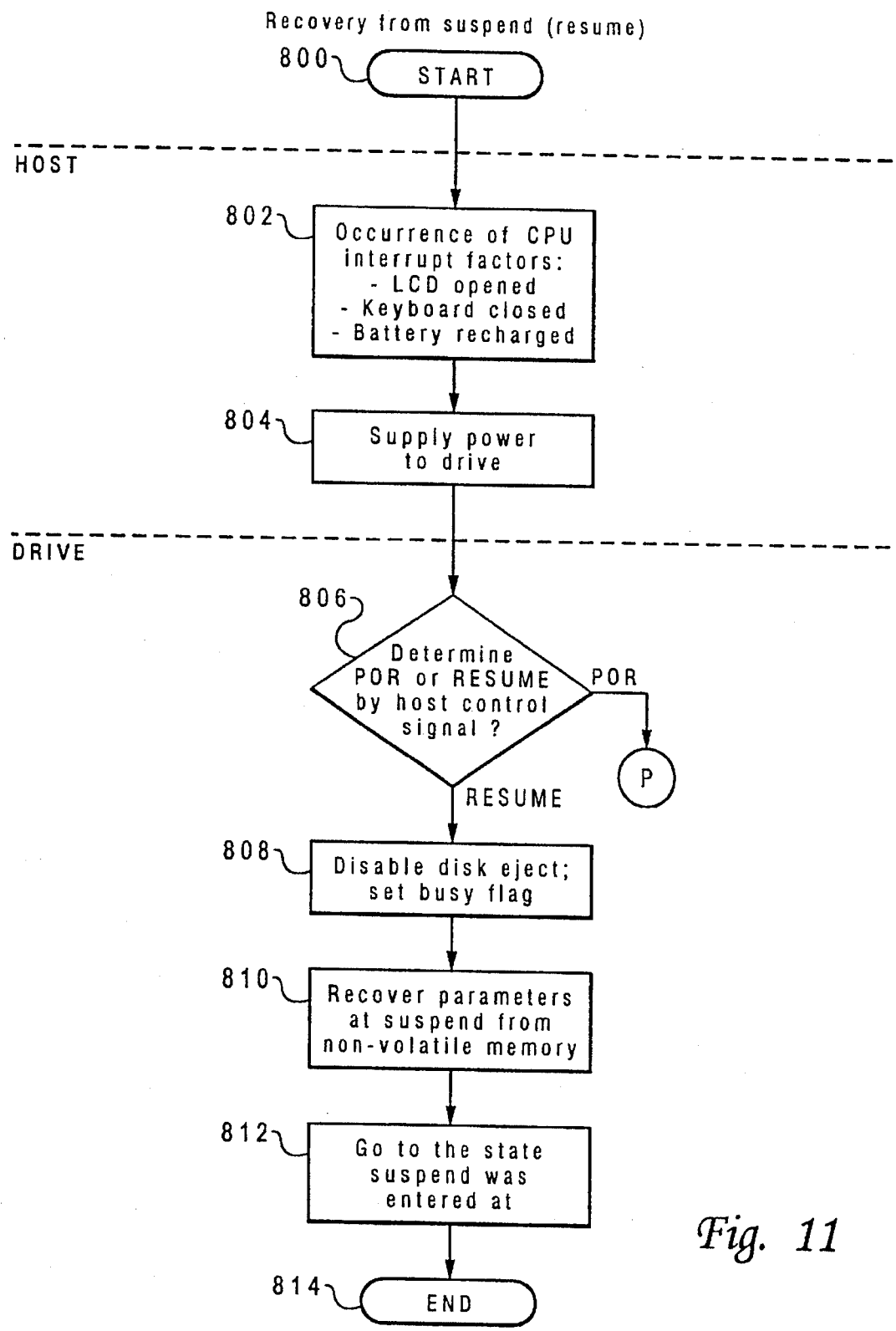
FIG. 11 illustrates transition of the operation modes of CD-ROM drive pertinent to an embodiment of the present invention, and specifically is a flow diagram illustrating a processing procedure for resume from suspend mode.

FIG. 11 shows a procedure for resuming from the suspend mode. In the suspend mode, upon detecting a specified event indicating the possibility of restarting a task, such as "LCD is opened", "keyboard is closed", and "battery 119 is recharged", an interrupt of main CPU 70 occurs at step 802 to initiate the operation for restarting the task. As part of this resume operation, power supply 13 to drive 50 is regained at step 804. It should be understood that details of processing for resume at the host is beyond the scope of the present invention and will not be described herein.

At the drive 50, power supply alone does not provide the determination if it is for normal POR or resume. To allow the determination, the host issues host control signal 19 which differs in waveform from that for resume (refer to section E for details). At step 806, if a normal POR is determined, the procedure described in FIG. 5 and section D.1 is performed via branch P. On the other hand, if the decision is made that the power supply is for resume, processing goes to the following step 808.

At step 808, drive 50 disables the ejection of the disk and sets the busy flag to disable reception of a host command. Next, at step 810, the data being saved in flash memory 17 is restored into each unit. As described above, the information restored in this step includes the TOC information, audio and drive parameters, and values of each register within interface circuit 9. It should be noted that data transfer becomes faster since the TOC information is not read again from the disk, but restored from the semiconductor memory. This process is considerably different than normal POR (see step 220 in FIG. 5 and section D.1). It should also be noted that the task context is not destroyed since the status at the time of task interruption, including audio and drive parameters and register values, is restored. This also differs considerably from that of normal POR. (During POR, the device driver specifies a given value or drive 50 itself sets a default value. See steps 212 and 230 in FIG. 5 and section D.1.)

Next, drive 50 moves into the operation mode which was taken at the time of entering the suspend mode (step 812). The operation mode taken at the time of entering the suspend mode has been recorded in the status register within interface circuit 9. Since the contents of the status register has been restored in earlier step 810, reference to them ensures return to the same operation mode. In this manner, all processing for resume is completed (step 814).

E. Timing Diagram of the Operation of Host Control and Drive Status Signals

As described above, CD-ROM drive 50 pertinent to the present invention may enter the other modes not with a host command but with host control signal 19. In addition, the intention of the host may communicate only with host control signal 19 because the halt of clock 14 of CPU 10 inhibits reception of the host command. It should be understood by those skilled in the art that host control signal (CS) 19 acts in cooperation with drive status signals 20 (SS1 and SS2). This section will describe the relationship between each signal line and the operation of drive 50 with reference to FIGS. 12 to 16. In each timing diagram shown in FIGS. 12 to 16, the first line denotes the signal level of host control signal (CS) 19, the second line denotes the signal level of drive status signal SS1, the third line denotes the signal level of drive status signal SS2, the fourth line denotes the voltage level of supply power from the host, and the fifth line denotes the operation mode of drive 50.

E.1. Transition From Active, Idle and Standby to Sleep Mode

FIG. 12 is a timing diagram of each signal when a sleep request is issued by host control signal CS. Host control signal CS is normally kept at a high level and used to send a low level pulse wave (hereinafter called pulse wave) as a hardware interrupt when an intention of the host is communicated to CPU 10. That is, if the host wants to lower the operation mode of drive 50 by a single level, it sends a low level pulse wave only once to host control signal CS to transfer its request. To further lower the operation mode by one level, the host sends the pulse wave once again within a specified time duration (T1). To enter a further lower level of operation mode, the host sends the pulse wave the third time within a specified time duration (T1) after the last pulse wave. Therefore, host control signal CS for requesting sleep is represented by three consecutive pulse waves, as shown in FIG. 12(a), when drive 50 is in the active mode, by two consecutive pulse waves, as shown in FIG. 12(b), when in the idle mode and by a single pulse wave, as shown in FIG. 12(c), when in the standby mode, respectively.

Drive 50, upon receiving such sleep request, takes a slight time delay to start a predetermined procedure for transition to the sleep mode (see steps 410 to 420 in FIG. 7 and section D.3). At this time, drive 50 sets the busy flag and turns drive status signal SS1 into a low level. Drive status signal SS1 is kept at a high level when drive 50 is in a ready state, and goes to a low level when a busy state is entered. Thus, when drive status signal SS1 is at a low level, the host command or disk eject request is negated.

If successful in the procedure preparatory for transition to the sleep mode, drive 50 sends a single pulse wave to drive status signal SS2 to inform the host of Sleep-in. The host remembers that drive 50 is in the sleep state by using the rise edge of this pulse wave for latching, i.e. sleep latch, as described above. After a slight time delay following the sleep-in pulse wave, drive 50 releases the busy flag and returns drive status signal SS1 to a high level to complete transition to sleep. During the operation series of entering the sleep mode, power supply 13 is kept at a voltage level of 5 V.

E.2. Wake-Up From Sleep Mode

Figure 13:
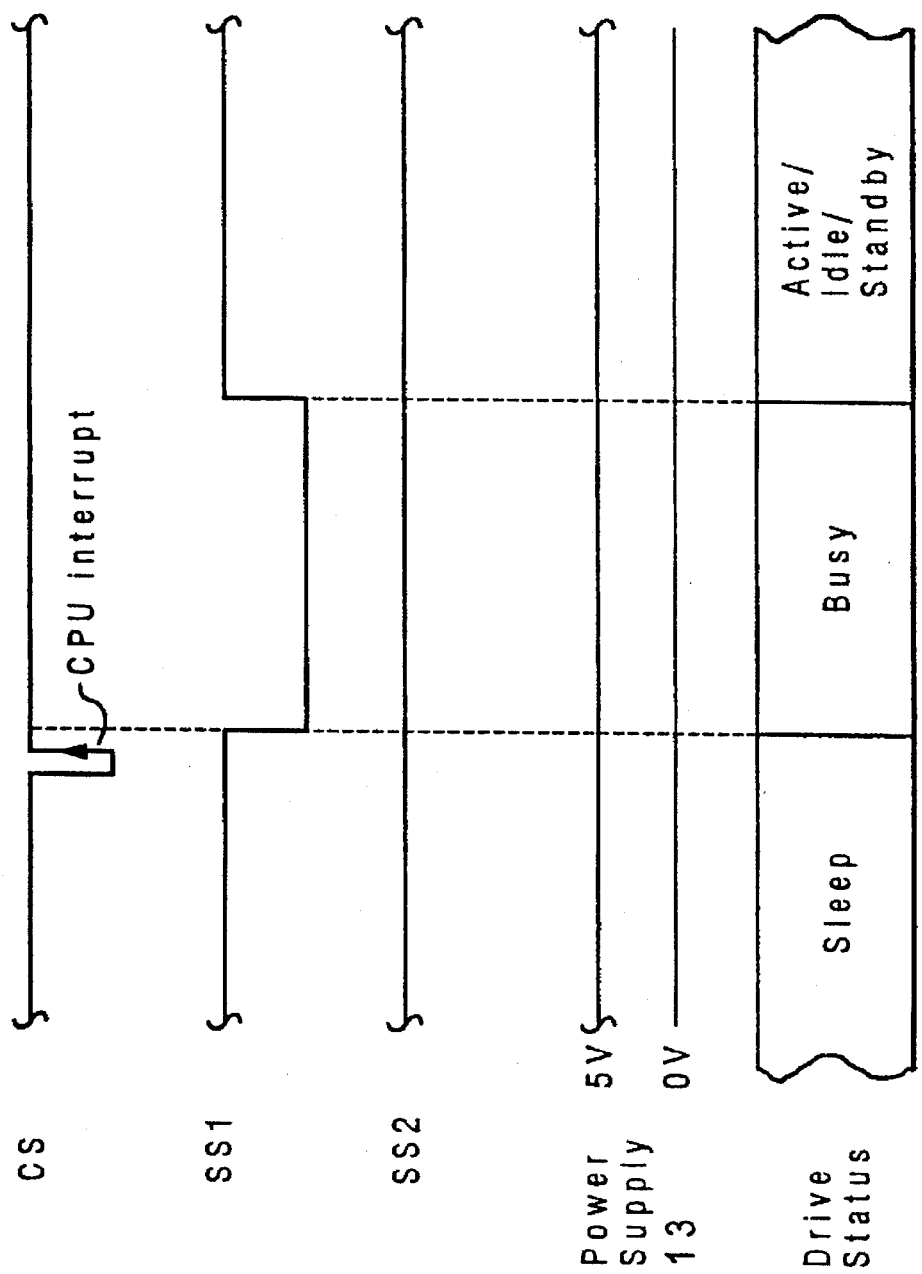
FIG. 13 illustrates operation of host control and drive status signals, and particularly is a timing diagram of each signal during wake-up from sleep.

FIG. 13 is a timing diagram of each signal at wake-up from sleep. The host sends a single pulse wave to host control signal CS to wake up drive 50 from sleep. The rising edge of this pulse wave is used as an interrupt for CPU 10 of drive 50.

When CPU 10 is interrupted, clock 14 is activated to allow a predetermined preparatory procedure for wake-up to be executed after a slight time delay (see steps 510 to 514 in FIG. 8 and section D.4). At this time, drive 50 sets the busy flag and turns drive status signal SS1 into a low level. If successful in the preparatory procedure for wake-up, drive 50 releases the busy flag and returns drive status signal SS1 to a high level. Drive 50 itself enters the operation mode which was present immediately before sleep, to complete a wake-up. During the operation series of waking up from sleep, drive status signal SS2 is kept at a high level and power supply at a voltage level of 5 V.

E.3. Transition From Active, Idle and Standby to Suspend Mode

Figure 14:
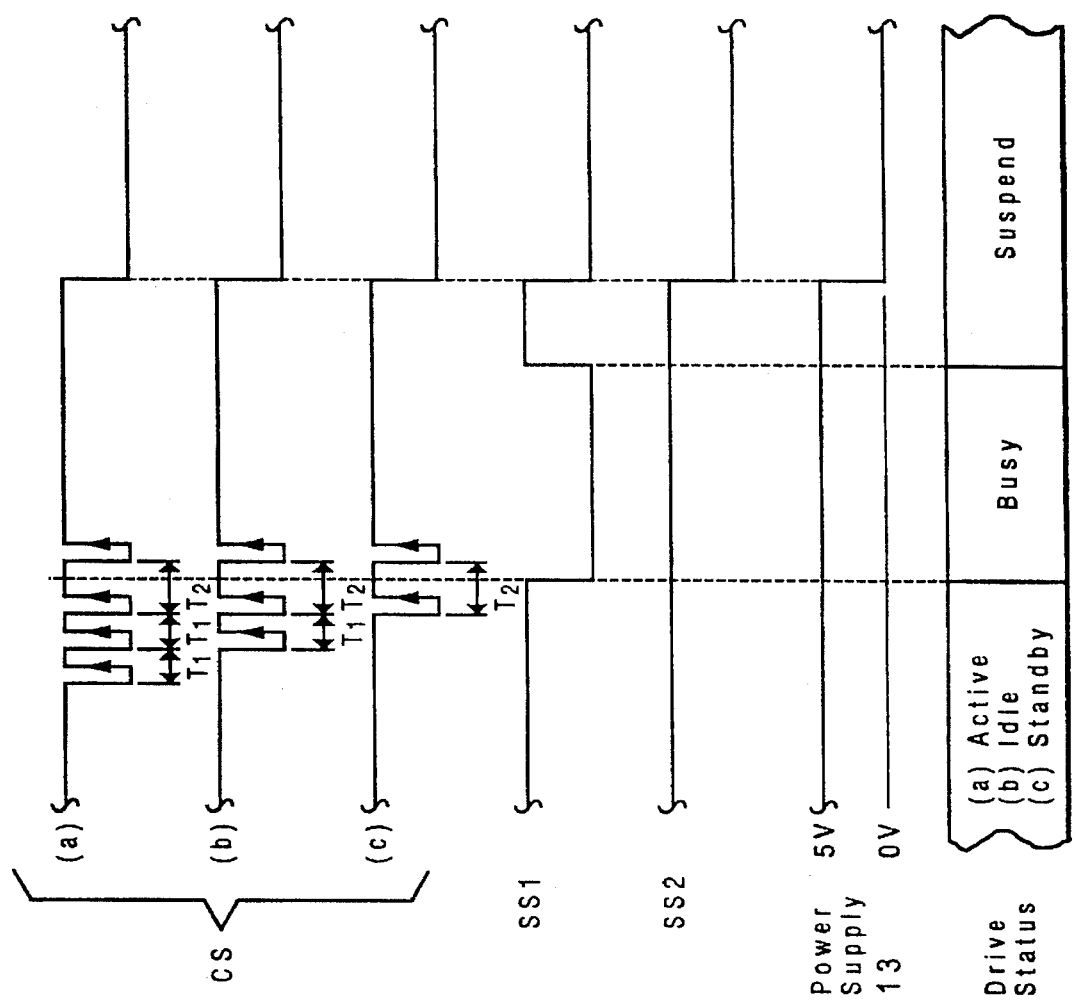
FIG. 14 illustrates operation of host control and drive status signals, and particularly is a timing diagram of each signal when a suspend request by the host control signal causes transition from active, idle or standby to suspend mode, in accordance with a preferred embodiment of the present invention.

FIG. 14 shows a timing diagram of each signal when a suspend request is sent by host control signal CS. Host control signal CS for requesting a suspend depends on the current operation mode of drive 50. In the active mode, as shown in FIG. 14(a), three consecutive pulse waves having an equivalent interval (T1) are sent and after a predetermined time duration (T2:T2>T1), a single pulse wave follows. Similarly, in the idle mode, as shown in FIG. 14(b), two consecutive pulse waves having an equivalent interval (T1) are sent and after a predetermined time duration (T2), a single pulse wave follows: In the standby mode, as shown in FIG. 14(c), a single pulse wave is sent and after a predetermined time duration (T2), another single pulse wave follows.

Drive 50 starts a given procedure for preparation (see steps 610 to 618 in FIG. 9 and section D.5) within the specified time duration (T2) after receiving the first chain of pulse waves. At this time, drive 50 sets the busy flag and turns drive status signal SS1 into a low level. Then drive 50 cannot determine if host control signal CS is a sleep or suspend request. Thus, the preparatory sequence then executed is not different from that for transition to sleep (see section E.1).

Next, drive 50, upon receiving a pulse wave again which follows the last pulse wave after a specified time duration (T2), determines that this host control signal CS is for a suspend request. Drive 50 then starts to save the contents of RAM 15 and each register of interface circuit 9 in flash memory 17 (see step 624 in FIG. 9 and section D.5). If successful in saving data in flash memory 17, drive 50 releases the busy flag and returns drive status signal SS1 to a high level. At this time, drive 50 itself enters the suspend mode.

Thereafter, the host confirms that the procedure for entering suspend for the host itself, other expansion devices, and the like has been completed, to suspend power supply 13. In response to this suspension of power supply, the host control signal and drive status signals SS1 and SS2 are also turned into a low level.

E.4. Transition From Sleep to Suspend Mode

Figure 15:
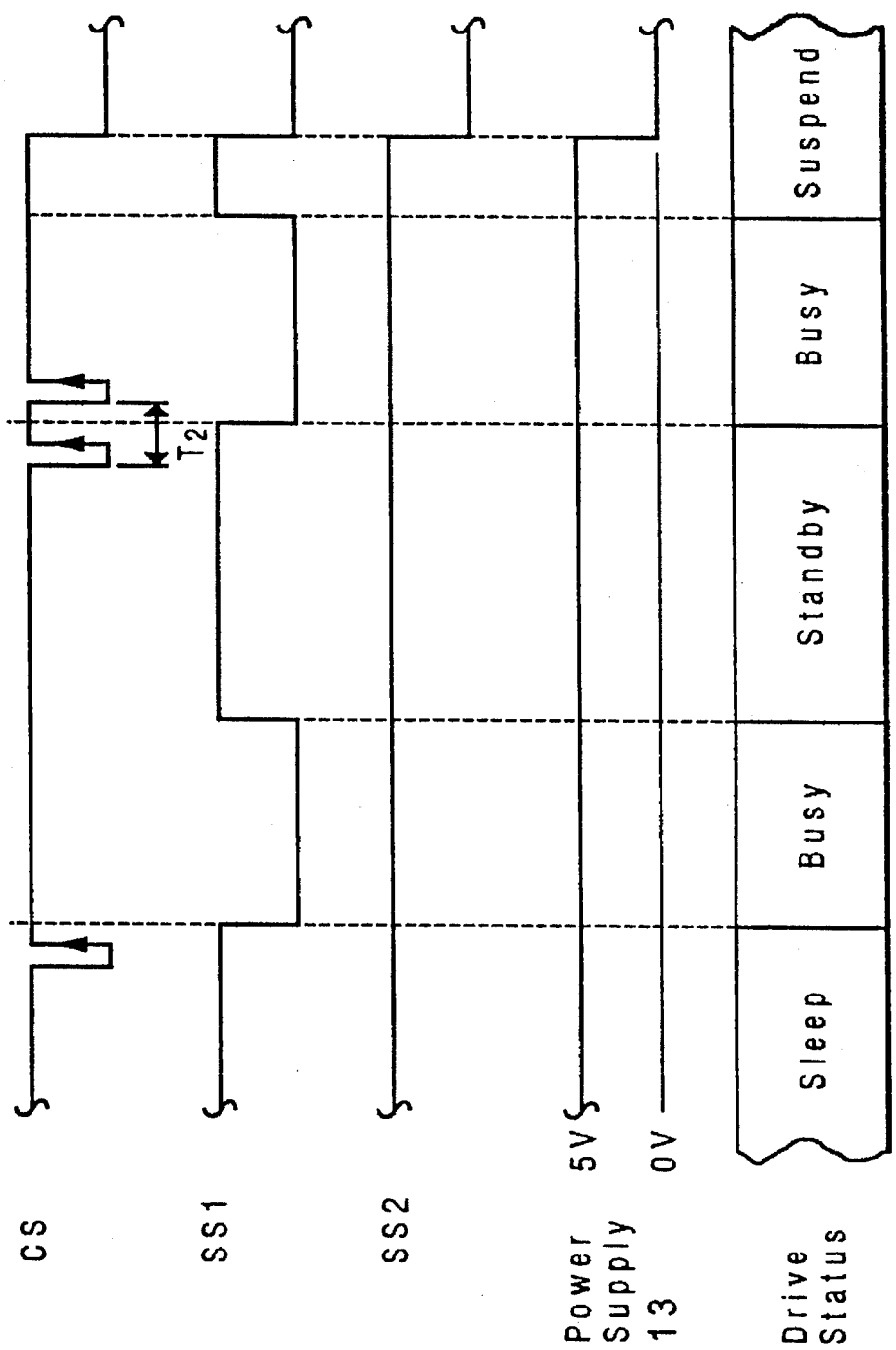
FIG. 15 illustrates operation of host control and drive status signals, and particularly is a timing diagram of each signal during transition from sleep to suspend mode.

FIG. 15 is a timing diagram of each signal during transition from sleep to suspend mode. Drive 50, if in the sleep mode, must return from a temporary halt state for processing such as saving data in flash memory 17. Then, the host sends a single pulse wave to host control signal CS to interrupt CPU 10 of drive 50. Next, drive 50 executes a given procedure for returning to the standby mode, such as activating clock 14. At this time, drive 50 sets the busy flag and turns drive status signal SS1 into a low level. Details of these operations are the same as for wake-up from sleep to standby described in Section E.2.

Returning to the standby mode, drive 50 releases the busy flag and returns drive status signal SS1 to a high level. Next, it performs a procedure for transition from the standby to suspend mode. Details of the procedure are the same as that for E.3.

E.5. Resume From Suspend Mode

Figure 16:
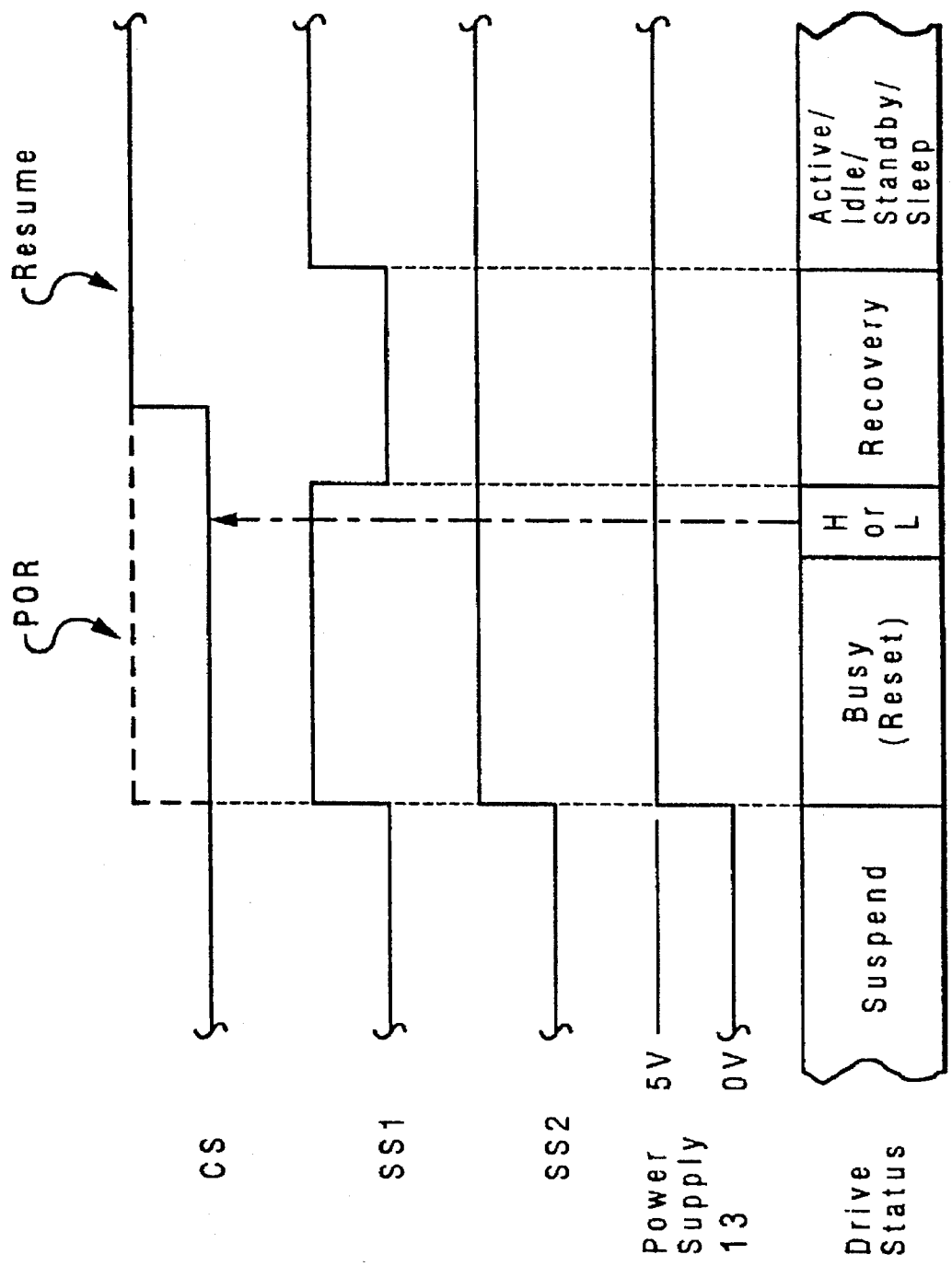
FIG. 16 illustrates operation of host control and drive status signals, and particularly is a timing diagram of each signal during resume from suspend mode, in accordance with a preferred embodiment of the present invention.

FIG. 16 is a timing diagram of each signal during resume from suspend mode. During suspend mode, the host starts resume operation when an interrupt factor occurs in main CPU 70 at the host, and as part of the operation, restarts power supply 13 to drive 50. In response to the restart of power supply 13, drive status signals SS1 and SS2 return to a high level. Drive 50 first performs reset processing such as returning pick up head 1 to its origin.

During normal POR, host control signal CS, as a drive status signal, is set to a high level upon power-on. On the other hand, during resume from suspend, the host keeps host control signal CS at a low level for a specified period of time. Therefore, drive 50 can determine that power supply is for resume (or for POR) by confirming host control signal CS of a low level (or high level) immediately after reset processing. Thus, the host asserts resume operation by keeping host control signal CS at a low level.

Upon detecting resume, drive 50 performs recovery processing such as restoring data from flash memory 17 into each component. Then drive 50 sets the busy flag and rams drive status signal SS1 into a low level. During that time, any host command or request of disk ejection is negated. Upon completing recovery operation, drive 50 releases the busy flag and realms drive status signal SS1 to a high level to return to the operation mode entered immediately before suspend.

Although this embodiment uses only a single drive status signal SS1 to allow requests for transition to a number of operation modes to be represented by varying the signal waveform, the principles of the present invention are not limited to this embodiment. For example, each transition to the operation mode could have its own signal line and any request for transition may be repressed by a single pulse wave.

F. Application to Magneto Optical Disk

A preferred embodiment pertinent to the present invention has been described which is limited to an expansion device of CD-ROM drive. However, magneto optical disks, which are similar effects, also s in structure and effects, also have problems which give rise to the present invention (This is also indicated in the Description of the Prior Art above). This section will briefly describe that the present invention can also be practiced in magneto optical disk drives.

Figure 17:
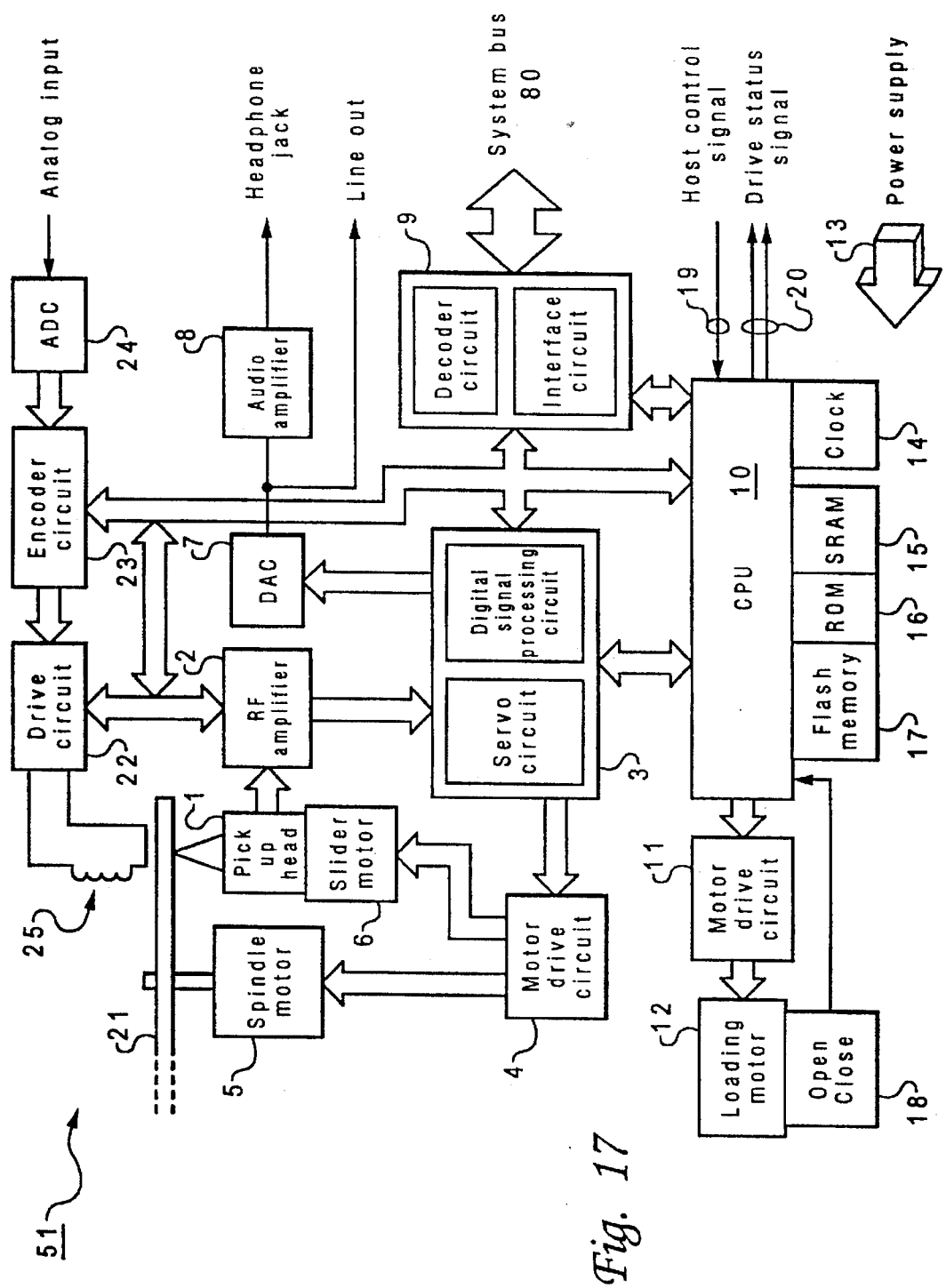
FIG. 17 is the hardware configuration of a magneto optical disk drive for carrying out the present invention, in accordance with a preferred embodiment of the present invention.
Figure 18:
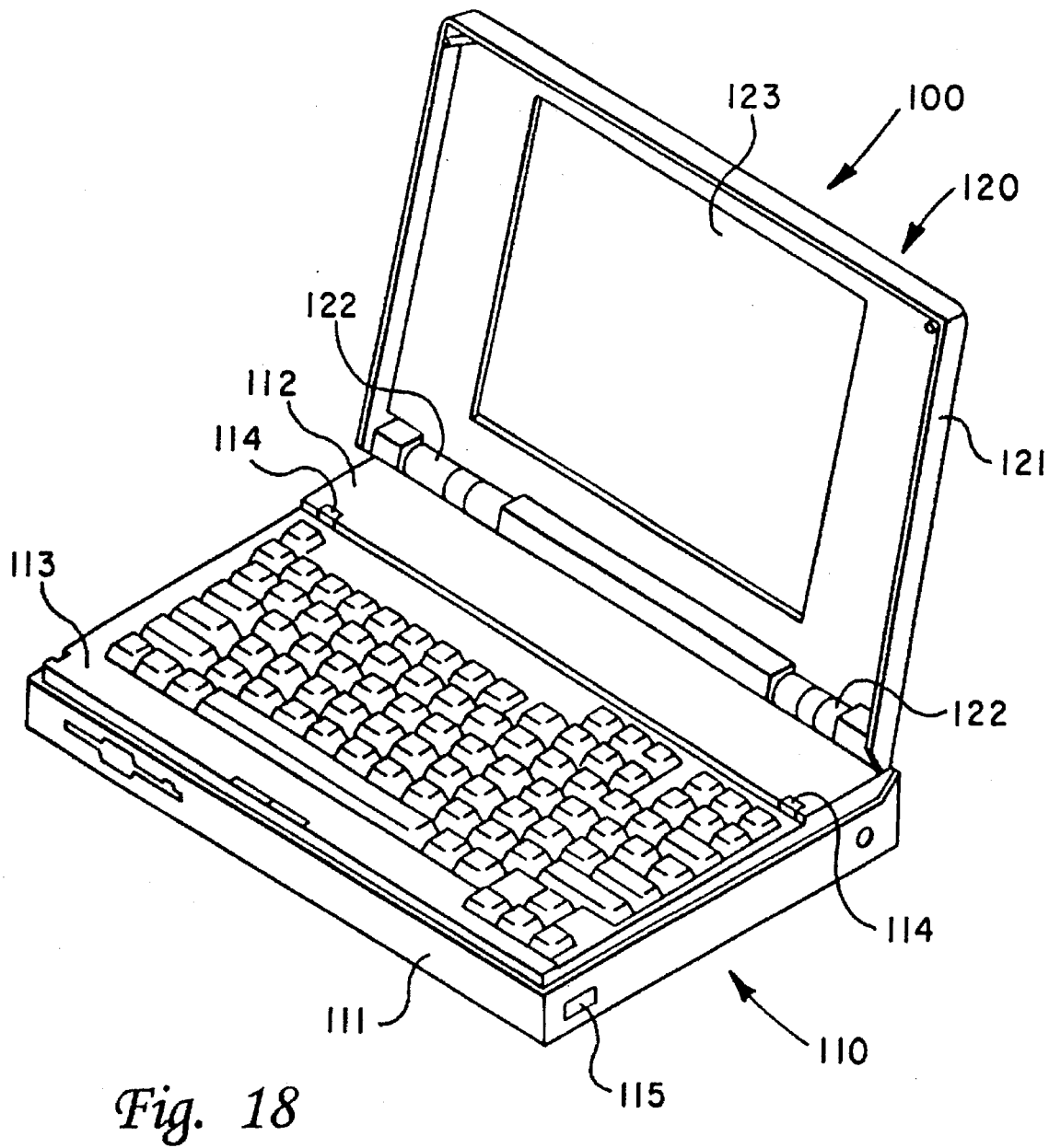
FIG. 18 is an isometric view of a portable computer, and particularly illustrating a usable state with LCD opened.
Figure 19:
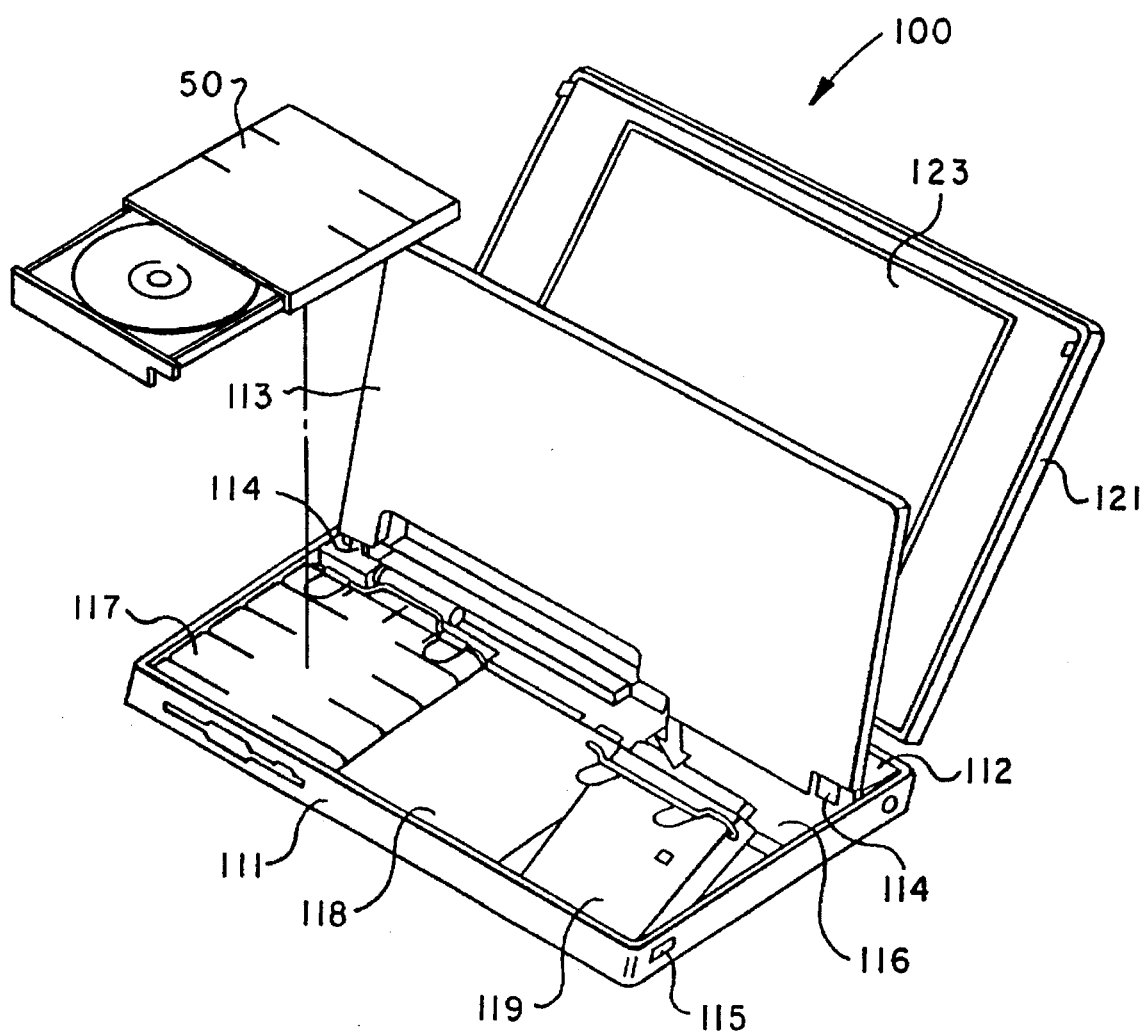
FIG. 19 is an isometric view of the portable computer, and particularly illustrating a state in which the case interior is exposed with LCD and the keyboard opened.

FIG. 17 shows the hardware configuration of magneto optical disk drive 51 in which the present invention is practiced. Identical reference numbers indicate similar components to those shown in FIG. 2. Magneto optical disk drive 51 differs from CD-ROM drive 50 in that drive 51 further includes magnetic coil 25 for write operation to magneto optical (MO) disk 26, drive circuit 22 for driving magnetic coil 25, analog/digital converter circuit (ADC) 24 for converting analog input into digital signals and encoder circuit 23 for encoding signals. It should be readily understood by those skilled in the art that descriptions in sections A to E also apply to this magneto optical disk drive 51.

In accordance with the present invention, it is possible to provide an expansion device detachably installed into a computer system (host) and capable of response to a series of operations for power management at the host. Furthermore, it is possible to provide an environment for a portable computer system wherein the expansion device itself saves the information which is required during resume operation and cannot be managed at the host when the suspend mode is entered, thereby allowing a task to be restarted quickly and from precisely the same point of execution during resume.

While the invention has been particularly shown and described with reference to a preferred embodiment, it will be understood by those skilled in the art that various changes in form and detail may be made therein without departing from the spirit and scope of the invention.

What is claimed is:

1. An expansion device detachably installed into a computer system having a main central processing means, comprising:

a second central processing means within said expansion device for controlling the operation of said expansion device;

a first memory within said expansion device containing data, which is volatile, for use as a working area by said central processing means in handling tasks;

interface means containing context information for communicating with said computer system;

means for supplying power to each element in said expansion device; and a second memory within said expansion device and coupled to said second central processing means, which is non-volatile and write-enable, for saving the context information held by said interface means and the data stored in said first memory, in response to a request from said computer system via said interface means such that operation of said expansion device may be resumed utilizing said context information.

2. An expansion device detachably installed into a computer system according to claim 1, further comprising:

a spindle motor for mounting a storage medium disk to rotate said disk;

a head for accessing data on said disk;

a slider motor for moving said head along the radial direction of said disk;

a motor drive means for driving said spindle and slider motors;

a processor means for processing the output of said head; and a motor drive controller means for controlling said motor drive means.

3. The expansion device of claim 1, characterized in that said expansion device is a CD-ROM drive.

4. The expansion device of claim 1, characterized in that said expansion device is a magneto optical disk drive.

5. The expansion device of claim 1, characterized in that said first memory is a static RAM.

6. The expansion device of claim 1, characterized in that said interface means receives a request from said computer system in the form of a command.

7. The expansion device of claim 1, characterized in that said interface means receives a request from said computer system in the form of a hardware interrupt.

8. The expansion device of claim 1, characterized in that said second memory is a flash memory.

9. A method for controlling an expansion device detachably installed into a computer system having a main central processing means, wherein the expansion device includes a second central processing means for controlling the operation of said expansion device, a first memory within said expansion device, which is volatile, interface means containing context information for communicating with said computer system, means for supplying power to each element in said expansion device, and a second memory within said expansion device, which is non-volatile and write-enable, for saving the context information held by said interface means and data stored in said first memory, the method comprising the steps of:

receiving a notification of a power down request from said main central processing means in said computer system;

saving in said second memory within said expansion device the context information held by said interface means and the data stored in said first memory, in response to said notification; and notifying said main central processing means within said computer system of the completion of said saving step within said expansion device.

10. A method for controlling an expansion device detachably installed into a computer system according to claim 9, further comprising the step of powering down the power supply means in response to said notification.

11. A method for controlling an expansion device detachably installed into a computer system according to claim 9, further comprising the step of idling the expansion device while not stopping at least one operation of said motor drive means and said second central processing means.

12. A method for controlling an expansion device of claim 11, wherein a first predetermined period of time expires after the last disk access before said idling step is entered.

13. A method for controlling an expansion device detachably installed into a computer system according to claim 11, further comprising the step of changing the operational mode of the expansion device from idle to standby, while not stopping at least the operation of said second central processing means.

14. A method for controlling an expansion device of claim 13, wherein a second predetermined period of time expires after the last disk access before said standby mode is entered.

15. A method for controlling an expansion device detachably installed into a computer system according to claim 13, further comprising the step of changing the operational mode of the expansion device from standby to sleep, while not stopping at least the operation of said second central processing means.

16. A method for controlling an expansion device of claim 15, wherein a third predetermined period of time expires after the last disk access before said sleep mode is entered.

17. A method for controlling an expansion device detachably installed into a computer system having a main central processing means, wherein the expansion device includes, a second central processing means for controlling the operation of said expansion device; a first memory within said expansion device, which is volatile, interface means for communicating with said computer system; means for supplying power to each element in said expansion device; and a second memory within said expansion device, which is non-volatile and write-enable, for saving context information held by said interface means and data stored in said a first memory, the method comprising the steps of:

receiving an instruction from said main central processing means within said computer system when power supply to each element is restarted;

restoring the data saved in said second memory within said expansion device to said interface means and said first memory, in response to said instruction; and notifying said main central processing means within said computer system of the completion of said restoring step within said expansion device.

18. A method for controlling an expansion device detachably installed into a computer system according to claim 17, further comprising the step of restarting the power supply means, in response to said instruction.

* * * * *